US008553315B2

(12) United States Patent
Sato

(10) Patent No.: US 8,553,315 B2
(45) Date of Patent: Oct. 8, 2013

(54) ELECTROPHORETIC DISPLAY DEVICE, DRIVING METHOD OF ELECTROPHORETIC DISPLAY DEVICE, AND ELECTRONIC APPARATUS

(75) Inventor: Takashi Sato, Chino (JP)

(73) Assignee: Seiko Epson Corporation, Tokyo (JP)

( * ) Notice: Subject to any disclaimer, the term of this patent is extended or adjusted under 35 U.S.C. 154(b) by 262 days.

(21) Appl. No.: 13/205,202

(22) Filed: Aug. 8, 2011

(65) Prior Publication Data
US 2012/0069425 A1 Mar. 22, 2012

(30) Foreign Application Priority Data

Sep. 16, 2010 (JP) .................................. 2010-208418

(51) Int. Cl.
*G02B 26/00* (2006.01)
*G09G 3/34* (2006.01)

(52) U.S. Cl.
USPC .............................. 359/296; 345/85; 345/107

(58) Field of Classification Search
USPC .................................... 359/296; 345/85, 107
See application file for complete search history.

(56) References Cited

U.S. PATENT DOCUMENTS

| 6,762,744 | B2 * | 7/2004 | Katase | 345/107 |
|---|---|---|---|---|
| 2006/0028427 | A1 * | 2/2006 | Katase | 345/107 |
| 2007/0126694 | A1 * | 6/2007 | Moriyama et al. | 345/107 |
| 2007/0211330 | A1 | 9/2007 | Ohshima et al. | |
| 2007/0268245 | A1 | 11/2007 | Sugita et al. | |
| 2009/0122390 | A1 * | 5/2009 | Liang et al. | 359/296 |
| 2009/0268274 | A1 | 10/2009 | Masuzawa et al. | |
| 2010/0127966 | A1 * | 5/2010 | Miyamoto | 345/107 |
| 2011/0248909 | A1 * | 10/2011 | Sato | 345/107 |
| 2011/0285756 | A1 * | 11/2011 | Sato | 345/690 |

FOREIGN PATENT DOCUMENTS

| JP | A-2007-240679 | 9/2007 |
|---|---|---|
| JP | A-2007-310182 | 11/2007 |
| JP | A-2009-009092 | 1/2009 |
| JP | A-2009-098382 | 5/2009 |
| WO | WO 2010/110806 A1 | 9/2010 |

* cited by examiner

*Primary Examiner* — Evelyn A. Lester
(74) *Attorney, Agent, or Firm* — Oliff & Berridge, PLC

(57) ABSTRACT

An electrophoretic device includes: a first substrate and a second substrate; an electrophoretic layer including colored particles that is arranged between the first substrate and the second substrate; first electrodes; first transistors connected to the first electrodes; opposing electrodes that have larger areas than the first electrodes and have transparency; and a reflecting layer that has a larger area than the first electrodes, wherein the gradation is controlled by the area of the colored particles that is visible when the electrophoretic layer is seen from the second substrate side.

20 Claims, 22 Drawing Sheets

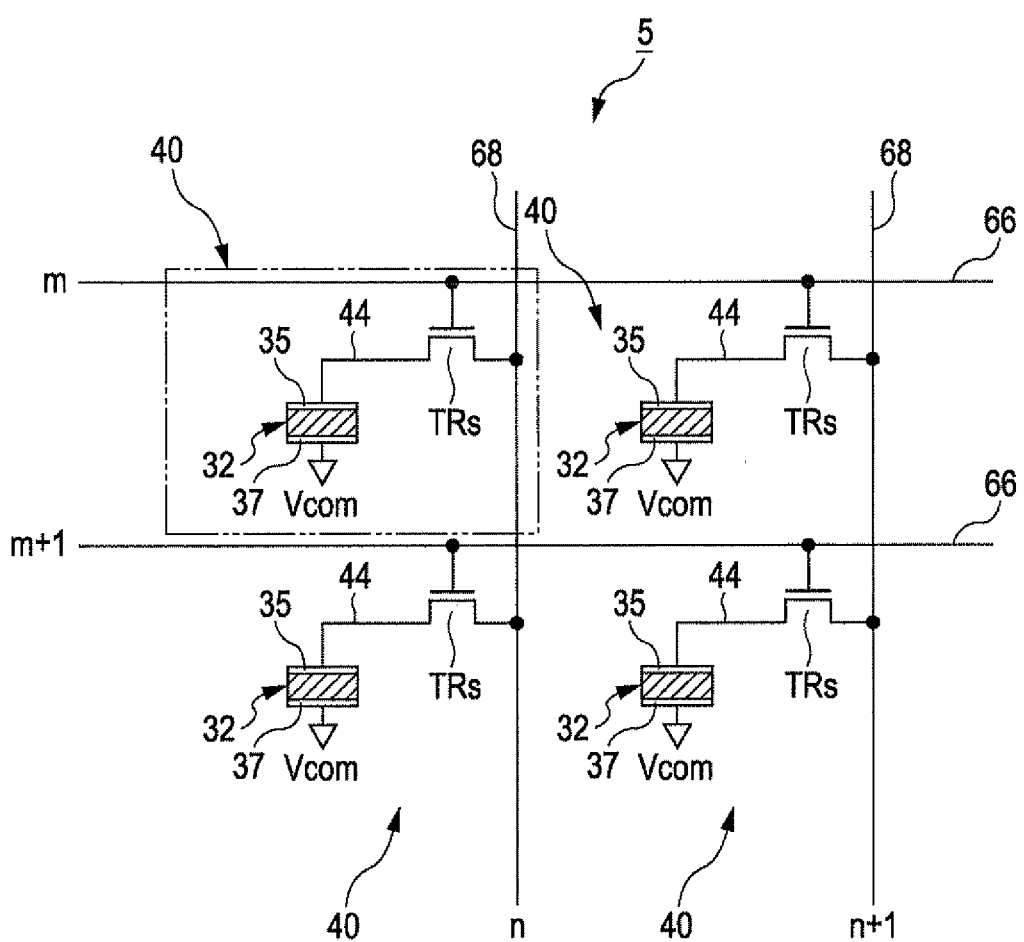

WHITE DISPLAY

BLACK DISPLAY

GRAY DISPLAY

WHITE DISPLAY

BLACK DISPLAY

GRAY DISPLAY

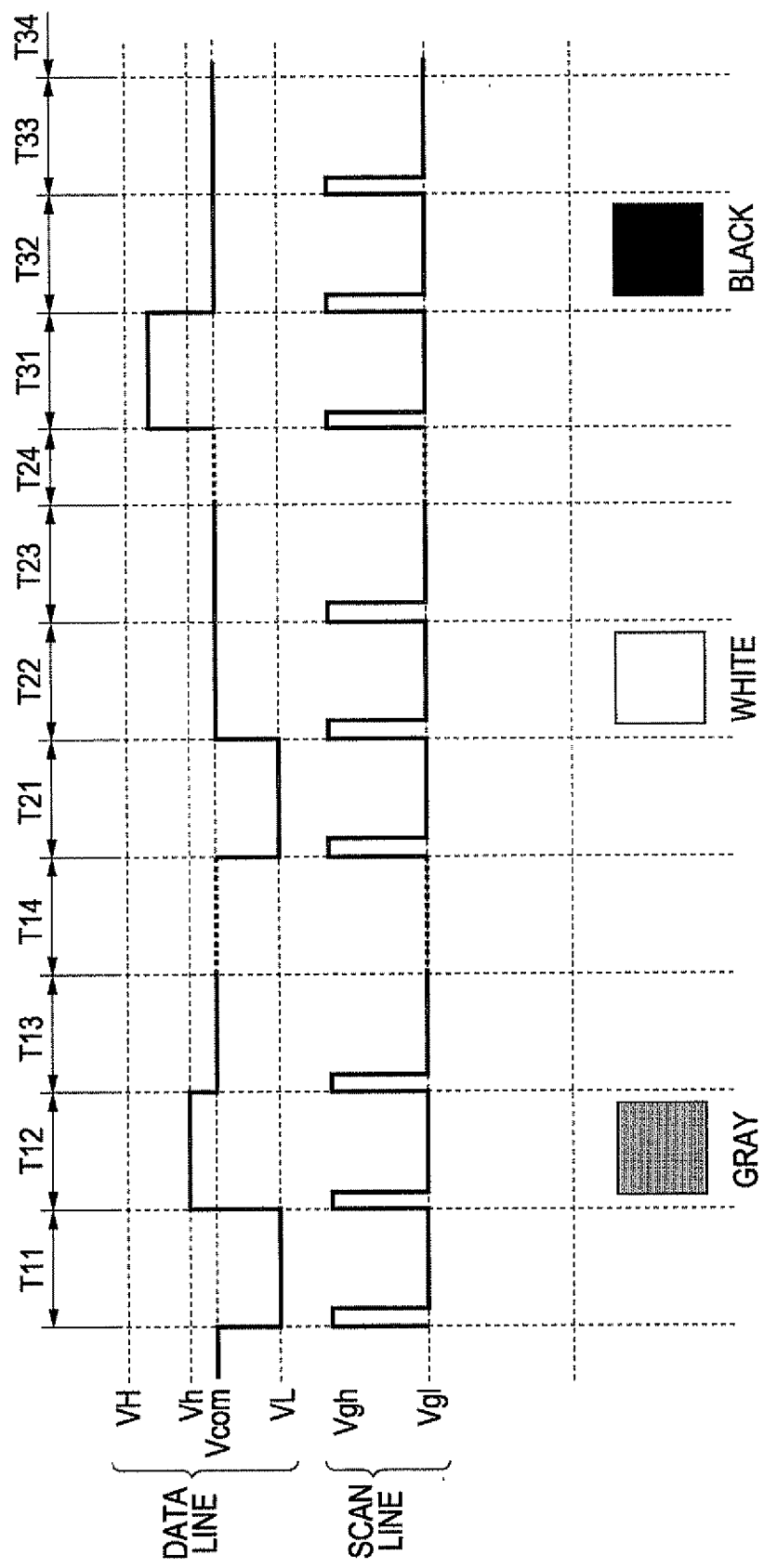

WHITE DISPLAY

BLACK DISPLAY

GRAY DISPLAY

WHITE DISPLAY

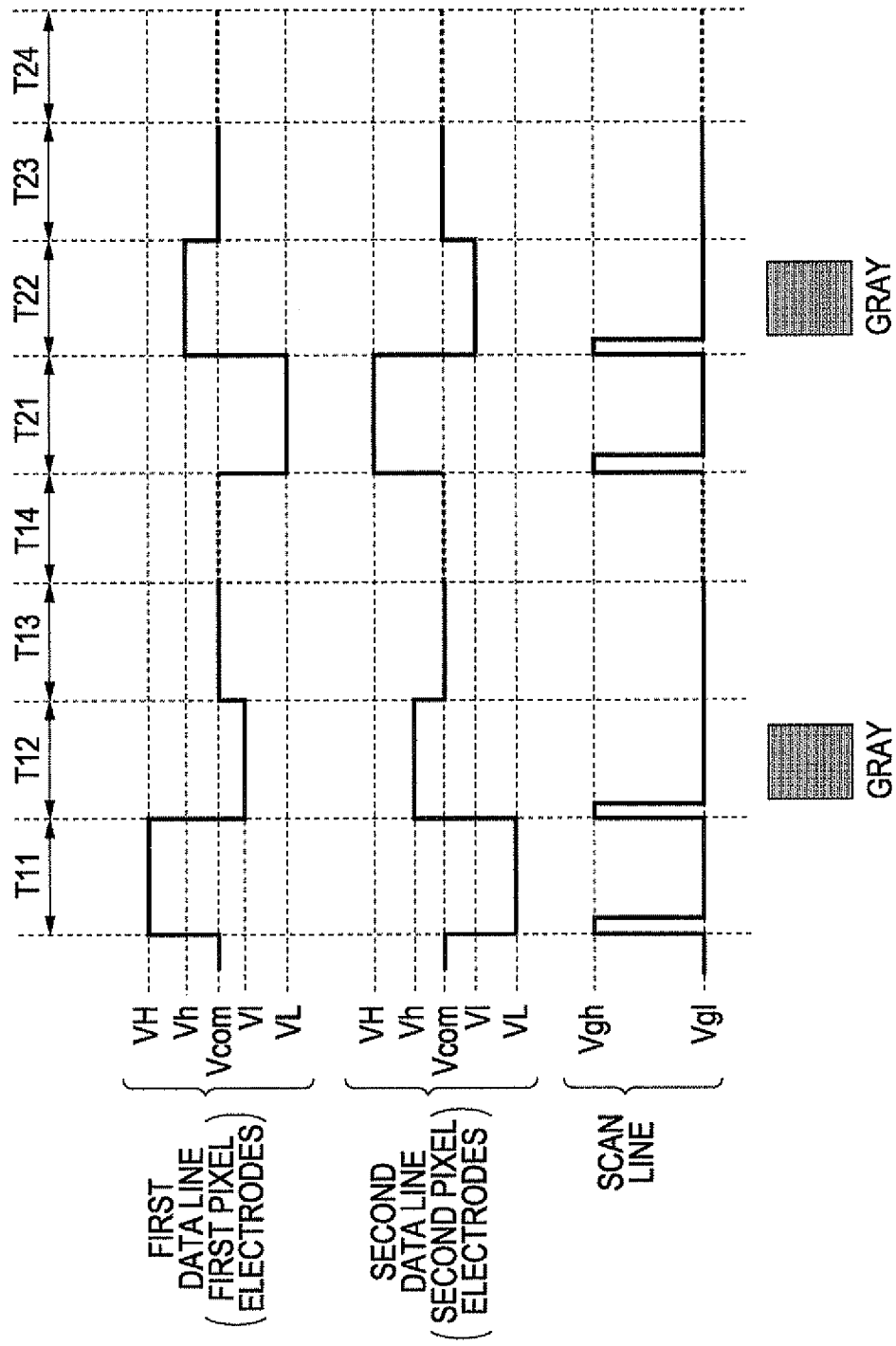

ELECTROPHORETIC DISPLAY DEVICE, DRIVING METHOD OF ELECTROPHORETIC DISPLAY DEVICE, AND ELECTRONIC APPARATUS

BACKGROUND

1. Technical Field

The present invention relates to an electrophoretic display device, a driving method of the electrophoretic device, and an electronic apparatus.

2. Related Art

In recent years, as a display unit of electronic paper and the like, electrophoretic display devices have been coming into use. An electrophoretic display device is configured to include an electrophoretic dispersion liquid that is a plurality of electrophoretic particles dispersed in a dispersion medium. An electrophoretic display device is a device utilizing a change in the optical property of the electrophoretic dispersion liquid accompanying a change in the dispersion state of the electrophoretic particles as a result of applying an electric field for display.

As such an electrophoretic display device, the concept of a color electrophoretic display device using three types of particles described in JP-A-2009-9092 and JP-A-2009-98382 has been proposed. The above literature describes driving using three electrodes in which the electric charge in the particles is positively charged, negatively charged, and uncharged.

Although the concept of controlling two types of charged particles by using two pixel electrodes inside one sub-pixel is described in the above literature, the specific relationship between the form of the pixel electrodes and the form of transistors is not shown. In order to realize a color display electrophoretic display device, there is an issue in the controllability of the brightness and saturation of one sub-pixel, and performing full color display is difficult. Therefore, in a color display electrophoretic display device, there is demand for a method of controlling at least one, or all three, of the brightness, saturation, and hue in an analog manner.

SUMMARY

An advantage of some aspects of the invention is that an electrophoretic display device that can control at least one, or all three, of the brightness, saturation, and hue by controlling the movement of charged particles and that can perform favorable display, a driving method of the electrophoretic display device, and an electronic apparatus are provided.

An electrophoretic display device according to an aspect of the invention includes: a first substrate and a second substrate; an electrophoretic layer that is arranged between the first substrate and the second substrate and that includes at least a dispersion medium and positively or negatively charged colored particles mixed into the dispersion medium; first electrodes that are formed for each pixel on the electrophoretic layer side of the first substrate and that are independently driven for each pixel; first transistors connected to the first electrodes; opposing electrodes that are formed on the electrophoretic layer side of the second substrate, have larger areas than the first electrodes, and have transparency; and a reflecting layer that is formed over the first substrate, reflects light, and that has a larger area than the first electrodes, wherein the gradation is controlled by the area of the colored particles that is visible when the electrophoretic layer is seen from the second substrate side.

By the configuration described above, the colored particles can be adsorbed over the first electrodes by applying a voltage, to the first electrodes, of the opposite polarity to the polarity charged to the colored particles, and the colored particles can be moved to the opposite electrode side by applying a voltage, to the first electrodes, of the same polarity as the polarity charged to the colored particles. The areas of the first electrodes and the opposing electrodes are asymmetrical, and the distribution areas of the colored particles over both substrates are also asymmetrical. The gradation can thereby be controlled by the area of the colored particles that is visible when the electrophoretic layer is seen from the second substrate side. Further, since a reflecting layer is provided over the first substrate, light incident from the second substrate side is reflected on the reflecting layer and a white display or gradation control of a display is possible.

In this manner, by controlling the area of the colored particles as well as providing the reflecting layer, at least one, or all three, of the brightness, saturation, and hue can be controlled, and an electrophoretic display device that can perform favorable display is obtained.

In addition, a configuration in which input of an electric potential to the reflecting layer is possible may be adopted.

For example, when moving the colored particles from the opposing electrodes to the first electrodes, it is possible to prevent (to repel) the colored particles from adsorbing to the reflecting layer by applying, to the reflecting layer, a voltage of the opposite polarity to the first electrodes or the same voltage as the opposing electrodes. Conversely, when moving the colored particles from the first electrodes to the opposite electrodes, a voltage of the same polarity is applied. In so doing, it is possible for the reflecting layer to repel the colored particles.

Further, a configuration in which the reflecting layer is arranged via a first insulating layer having light permeability further to the first substrate side than the first electrodes may be adopted.

In so doing, since it becomes possible to form the reflecting layer and the first electrodes by stacking on a plane, the area of the reflecting layer can be made large, and more of the light incident from the second substrate side can be reflected. In this manner, the utilization efficiency of the light can be improved and a clearer white display is possible.

Further, a configuration in which the reflecting layer is formed for each pixel and is connected to the first electrodes may be adopted.

In so doing, the reflecting layer can be made to have the same electric potential as the first electrodes. Thereby, for example, the colored particles distributed over the opposing electrodes are able to be moved swiftly to the first electrode side, and the colored particles gathered over the first electrodes are able to be moved swiftly to the opposing electrode side.

Further, a configuration in which a voltage that repels the colored particles is applied to the reflecting layer is preferable.

In so doing, since the colored particles can be repelled, the colored particles can be prevented from adsorbing to the reflecting electrodes.

Further, a configuration in which the reflecting layer is connected to a power source may be adopted.

In so doing, the colored particles are able to be moved to a desired position (first electrode side or opposing electrode side) without gathering over the reflecting layer.

Further, a configuration in which at least one portion of the reflecting layer is exposed from the first insulating layer to the electrophoretic layer side may be adopted.

In so doing, since there is no insulating layer over the reflecting layer, it is possible to reflect light efficiently.

Further, a configuration including first colored particles that are positively charged, second colored particles that are the same color as the first colored particles and that are negatively charged, second electrodes in the electrophoretic layer side of the first substrate, and second transistors connected to the second electrodes may be adopted.

In so doing, for example, by applying a negative voltage to the first electrodes and applying a positive voltage to the second electrodes, positively charged first colored particles can be gathered over the first electrodes and negatively charged second colored particles can be gathered over the second electrodes. In so doing, a white display is obtained, and an operation which resets the display is made possible.

Further, by applying the same voltage (for example, positive voltage) to the first electrodes and the second electrodes at the same time, the first colored particles can be moved to above the opposing electrodes while the second colored particles are gathered over the second electrodes. In this manner, display of intermediate gradations is made possible.

Further, a configuration including a plurality of the first electrodes for each pixel, wherein each of the plurality of first electrodes is connected to each other by a first connection electrode formed on a layer further to the first substrate side than the first electrodes may be adopted.

In so doing, since the same voltage can be applied to the plurality of first electrodes at the same time via the first connection electrodes, control of the voltage applied to each of the first electrodes is easy.

Further, a configuration including a plurality of the first electrodes and a plurality of the second electrodes for each pixel, wherein each of the plurality of first electrodes is connected to each other by the first connection electrode formed on a layer further to the first substrate side than the first electrodes, and each of the plurality of second electrodes is connected to each other by a second connection electrode formed on a layer further to the first substrate side than the second electrodes may be adopted.

In so doing, since the same voltage can be applied to the plurality of first electrodes at the same time via the first connection electrodes while the same voltage can be applied to the plurality of second electrodes at the same time via the second connection electrodes, control of the voltage applied to each of the first electrodes and each of the second electrodes is easy.

Further, a configuration in which the surface of the reflecting layer is a scattering surface that scatters the light may be adopted.

In so doing, the reflecting layer combines both functions of light reflection and light scattering, and cost reduction through a reduction in the number of parts is made possible.

Further, a configuration including a second insulating film on which a plurality of convex portions protruding toward the reflecting layer is formed further to the first substrate side than the reflecting layer may be adopted, wherein the scattering surface of the reflecting layer reflects the shape of the plurality of convex portions.

In so doing, by forming the reflecting layer over the second insulating film, the surface of the reflecting layer can become a scattering surface.

Further, a configuration in which scattering members that scatter the light are included between the reflecting layer and the second substrate side may be adopted.

In so doing, by the light incident from the second substrate side being reflected by the reflecting layer and emitted to an observer side after being reflected (scattered) once or a plurality of times by the scattering members, a display in which the brightness is increased and the visual characteristics are favorable is obtained. That is, a clearer white display is possible.

Further, a configuration in which a color filter is provided further to the second substrate side than the reflecting layer may be adopted.

In so doing, light incident from the second substrate side is colored by being incident on the color filter and is reflected to the electrophoretic layer side and the second substrate side by the reflecting layer. As a result, color display that is brighter and in which the visual characteristics are favorable is performed.

Further, a configuration in which a diffusion material is provided on an outer surface that is the opposite side to the electrophoretic layer side of the second substrate may be adopted.

In so doing, out of the reflected light reflected due to the diffusion material by the reflecting layer, even directly reflected light can be used in display as scattered light. In this manner, not only can glaring of the display be prevented, but the display luminance can also be improved.

A driving method of an electrophoretic display device according to another aspect of the invention including a first substrate and a second substrate, an electrophoretic layer that is arranged between the first substrate and the second substrate and that includes at least a dispersion medium and positively or negatively charged colored particles mixed into the dispersion medium, first electrodes that are formed for each pixel on the electrophoretic layer side of the first substrate and that are independently driven for each pixel, transistors connected to the first electrodes, opposing electrodes that are formed on the electrophoretic layer side of the second substrate, have larger areas than the first electrodes, and have transparency, and a reflecting layer that is formed over the first substrate and reflects light over a larger area than the first electrodes, wherein the gradation is controlled by the area of the colored particles that is visible when the electrophoretic layer is seen from the second substrate side, the driving method includes: a first operation of attracting the colored particles toward the first electrode side by applying a voltage to the first electrodes and the opposing electrodes; a second operation of attracting the colored particles toward the opposing electrode side by applying a voltage to the first electrodes and the opposing electrodes; and in the first operation and the second operation, an electric potential that repels the colored particles is applied to the reflecting layer.

In so doing, the colored particles can be moved to the first electrode side or the opposing electrode side, and the gradation of the display can be controlled by the area of the colored particles that is visible from the opposing electrode side. Further, as the light incident from the opposing electrode side is reflected by the reflecting layer to the opposing electrode side, a brighter display is obtained.

In this manner, by controlling the movement of the colored particles as well as providing the reflecting layer, at least one, or all three, of the brightness, saturation, and hue can be controlled, and an electrophoretic display device that can perform favorable display is obtained.

Further, a method in which in the first operation of attracting the colored particles toward the first electrode side, with an electric potential applied to the opposing electrodes as a reference, a voltage of a different polarity from the first electrodes or the same voltage as the opposing electrodes is applied to the reflecting layer may be adopted.

In so doing, the movement of the colored particles can be controlled, and the colored particles can be moved smoothly to the first electrode side. That is, by applying a voltage of a different polarity from the first electrodes or the same voltage as the opposing electrodes to the reflecting layer, the colored particles on the reflecting layer can be repelled and moved to the first electrode side. In so doing, the colored particles can be gathered swiftly over the first electrodes, and the switching time of the display can be shortened.

Further, a method including a first presetting operation of attracting the colored particles toward the first electrodes or the opposing electrode side by applying a positive voltage to the first electrodes with an electric potential applied to the opposing electrodes as a reference, and a second presetting operation of attracting the colored particles toward the first electrodes or the opposing electrode side by applying a voltage with the opposite polarity to that in the first presetting operation to the first electrodes may be adopted.

If the same voltage is repeatedly applied to the first electrodes, a DC voltage is applied between the first electrodes and the opposing electrodes. This is because a high voltage for reliably attracting the colored particles toward the first electrode side is applied when presetting, and a voltage with the opposite polarity and where the absolute value is equal to or lower than the equivalent is applied when writing an image. Accordingly, by reversing the polarity of the voltage applied to the first electrodes for each or a plurality of times that rewriting is executed, a DC voltage is prevented from being applied between the first electrodes and the opposing electrodes, and corrosion of the electrodes and deterioration in the electrophoretic material can be prevented. That is, the first presetting and the second presetting operations are alternately used.

Further, a method in which the electrophoretic display device includes first colored particles that are positively charged, negatively charged second colored particles in the same color as the first colored particles, and second electrodes to the electrophoretic layer side of the first substrate, the driving method further including: a first presetting operation that applies, to the first electrodes and the second electrodes, voltages that are different to one another or a voltage that is the same; and a second presetting operation that applies, to the first electrodes and the second electrodes, a voltage that has the opposite polarity from that of the first presetting operation may be adopted.

By reversing the polarity applied to the first electrodes and the second electrodes every time or every plurality of times that image rewriting (first presetting operation and second presetting operation) is executed, a DC voltage is prevented from being applied between the first electrodes and the second electrodes and the opposing electrodes, and corrosion of the electrodes and deterioration in the electrophoretic material can be prevented.

Further, a method in which the electrophoretic display device includes a first presetting operation of attracting the particles toward the first electrode and the second electrode sides by applying a positive voltage to the first electrodes against the opposing electrodes and a negative voltage to the second electrodes against the opposing electrodes, and a second presetting operation of attracting the first colored particles and the second colored particles toward the first electrode and the second electrode sides by applying a negative voltage to the first electrodes against the opposing electrodes and a positive voltage to the second electrodes against the opposing electrodes may be adopted.

Even in a case when there are the first electrodes and the second electrodes, if the same voltage is repeatedly applied to each electrode, a DC voltage is applied between the first electrodes and the second electrodes and the opposing electrodes, and corrosion of the electrodes and deterioration of the electrophoretic material are caused. However, by inverting the polarity applied to the first electrodes and the second electrodes for each or a plurality of times that rewriting is executed, a DC voltage is prevented from being applied between the first electrodes and the second electrodes and the opposing electrodes, and corrosion of the electrodes and deterioration in the electrophoretic material can be prevented.

Further, a method of implementing the first presetting operation and the second presetting operation alternately may be adopted.

In so doing, a DC voltage is prevented from being applied between the first electrodes and the second electrodes and the opposing electrodes, and corrosion of the electrodes and deterioration in the electrophoretic material can be prevented.

Still another aspect of the invention is an electronic apparatus provided with the electrophoretic display device described above.

By the above, since it is a configuration provided with the electrophoretic display device described above, a high-grade electronic apparatus that has excellent reliability and that can perform a display that is bright and has favorable visual characteristics is obtained.

BRIEF DESCRIPTION OF THE DRAWINGS

The invention will be described with reference to the accompanying drawings, wherein like numbers reference like elements.

FIG. 2 is an equivalent circuit diagram of one pixel in the electrophoretic display device.

FIG. 10 is a timing chart of when the electrophoretic display device of a single particle system is driven.

FIG. 17 is a timing chart of when the electrophoretic device of a two-particle system is driven.

FIG. 25A is a diagram illustrating a case when there is a plurality of pixel electrodes in one pixel, and FIG. 25B is a diagram illustrating a case when only one pixel electrode is arranged in one pixel.

FIG. 26A is a perspective diagram illustrating an electronic book that is one example of the electronic apparatus, FIG. 26B is a perspective diagram illustrating a watch that is another example of the electronic apparatus, and FIG. 26C is a perspective diagram illustrating electronic paper that is yet another example of the electronic apparatus.

DESCRIPTION OF EXEMPLARY EMBODIMENTS

First Embodiment

First, as an electrophoretic display device of a first embodiment, the configuration of a single particle system electrophoretic display device will be described.

Figure 1A:
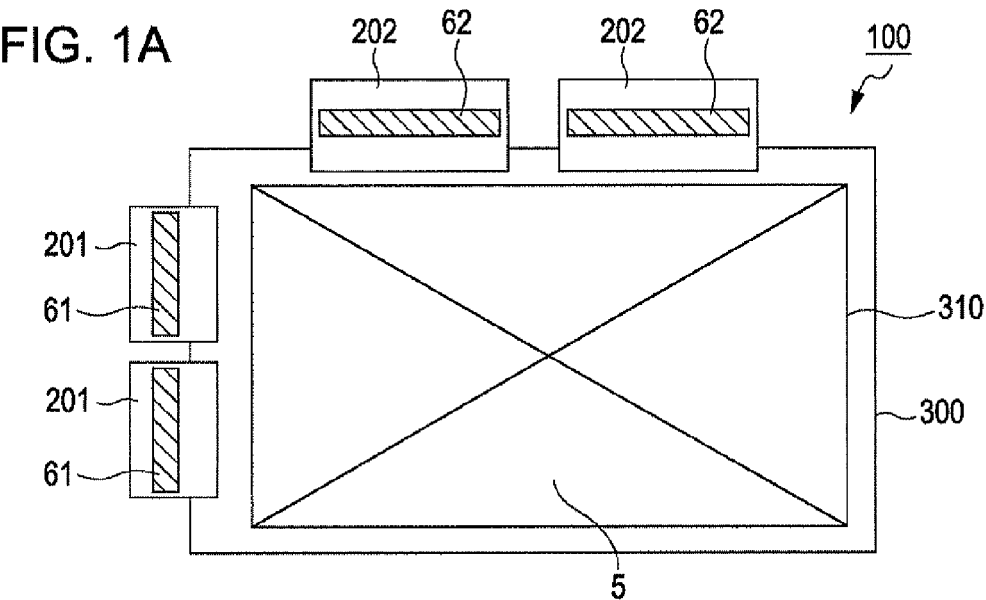
FIG. 1A is a plan diagram illustrating the overall configuration of the electrophoretic display device.

FIG. 1A is a plan diagram illustrating the overall configuration of the electrophoretic display device.

As illustrated in FIG. 1A, an electrophoretic display device 100 of the embodiment has planar dimensions where an element substrate 300 is larger than an opposing substrate 310, and is COF (Chip On Film) mounted (or TAB (Tape Automated Bonding) mounted) over flexible substrates 201 and 202 that are for connecting two scan line driving circuits 61 and two data line driving circuits 62 to an external apparatus, over the element substrate 300 projected further to the outside than the opposing substrate 310. Further, the flexible substrate 201 on which the scan line driving circuits 61 are mounted is mounted via an ACP (Anisotropic Conductive Paste), ACF (Anisotropic Conductive Film), and the like on a terminal forming region formed on a margin portion that is along one short side of the element substrate 300. Here, the element substrate 300 is configured with a first substrate 30 described later as a base, and the opposing substrate 310 is configured with a second substrate 31 described later as a base.

In addition, the flexible substrate 202 on which the data line driving circuits 62 are mounted is mounted via an ACP, ACF, or the like on the terminal forming region formed on a margin portion that is along one short side of the element substrate 300. On each terminal forming region is formed a plurality of connectional terminals, and scan lines and data lines described later that extend from a display unit 5 are connected to each connection terminal.

In addition, the display unit 5 is formed in a region in which the element substrate 300 and the opposing substrate 310 are stacked, and a plurality of wires (scan lines 66 and data lines 68) extending from the display unit 5 extends to a region where the scan line driving circuits 61 and the data line driving circuits 62 are mounted, and is connected to the connection terminal formed in the mounting region. Further, the flexible substrates 201 and 202 are mounted via an ACP or ACF to the connection terminals.

Figure 1B:
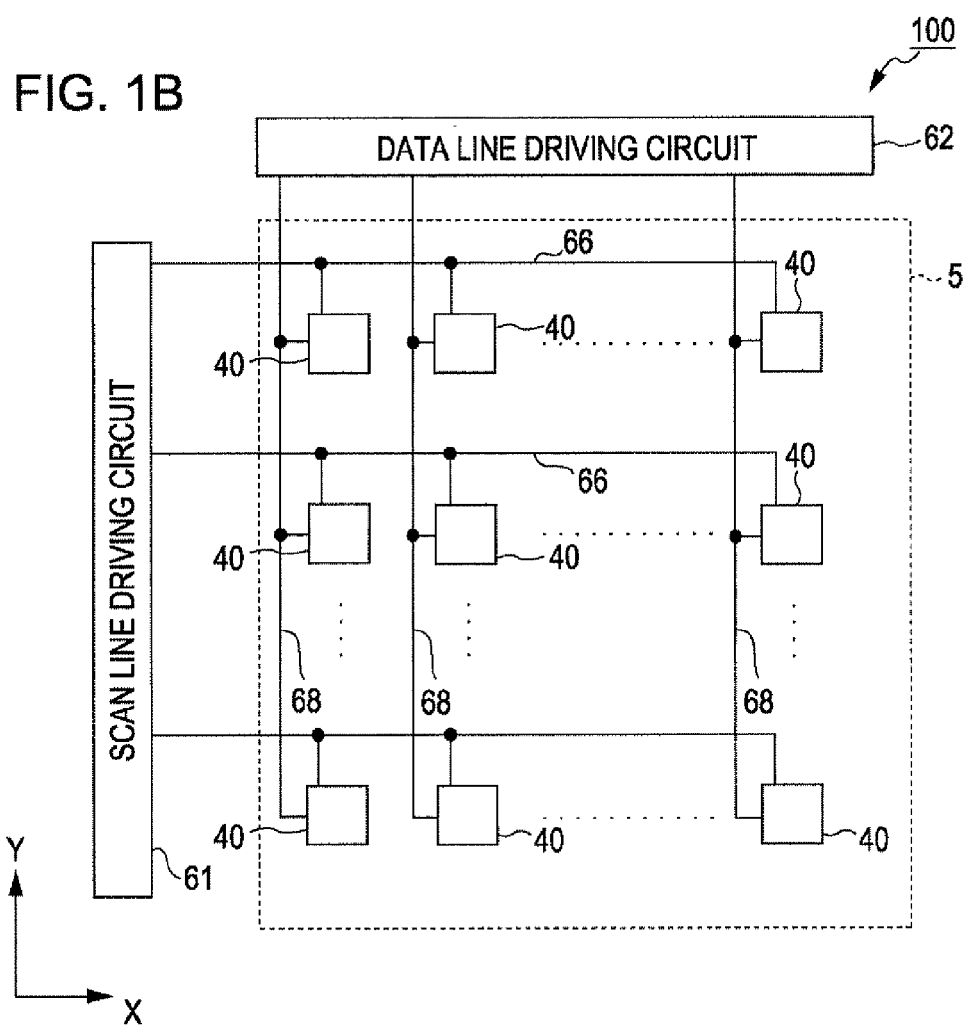
FIG. 1B is an equivalent circuit diagram illustrating the overall configuration of the electrophoretic display device.

FIG. 1B is an equivalent circuit diagram illustrating the overall configuration of the electrophoretic display device.

As illustrated in FIG. 1B, a plurality of pixels 40 is arranged in a matrix form on the display unit 5 of the electrophoretic display device 100. In the vicinity of the display unit 5, a scan line driving circuit 61 and a data line driving circuit 62 are arranged. The scan line driving circuit 61 and the data line driving circuit 62 are connected to a controller (not shown). The controller comprehensively controls the scan line driving circuit 61 and the data line driving circuit 62 based on image data and synchronization signals supplied from higher order devices.

On the display unit 5 are formed a plurality of scan lines 66 extending from the scan line driving circuits 61 and a plurality of data lines 68 extending from the data line driving circuit 62, and pixels 40 are provided in correspondence with the intersecting positions thereof.

The scan line driving circuits 61 are connected to each pixel 40 via the plurality of scan lines 66, and under the control of the controller, sequentially selects each scan line 66 and supplies a selection signals that regulates the timing of an on state of selection transistors (first transistors) TRs (see FIG. 2) provided on the pixels 40 via the selected scan lines 66. The data line driving circuits 62 are connected to each pixel 40 via a plurality of data lines 68, and under the control of the controller, supplies an image signal that regulates image data that corresponds to each pixel 40 to the pixels 40.

FIG. 2 is an equivalent circuit diagram of one pixel in the electrophoretic display device.

On the display unit 5 is provided the plurality of pixels 40 corresponding to the intersecting positions of the plurality of scan lines 66 (m, m+1, . . . ) and the plurality of data lines 68 (n, n+1, . . . ).

Pixel circuits of one pixel (pixel 40) are each configured to include an electrophoretic layer 32 as an electro-optical material and the selection transistors TRs for applying a voltage to the electrophoretic layer 32 by performing a switching operation.

With the selection transistors TRs of each pixel 40, the scan line 66 is connected to a gate, the data line 68 is connected to a source, and the electrophoretic layer 32 (pixel electrodes 35) is connected to a drain via a connection electrode 44.

The connection electrode 44 is connected, while being connected to the drain of the selection transistor TRs, to the plurality of pixel electrodes (first electrode) 35.

Here, although a storage capacitor is not mentioned in FIG. 2, there may be an equivalent circuit with a storage capacitor added thereto.

Figure 3:
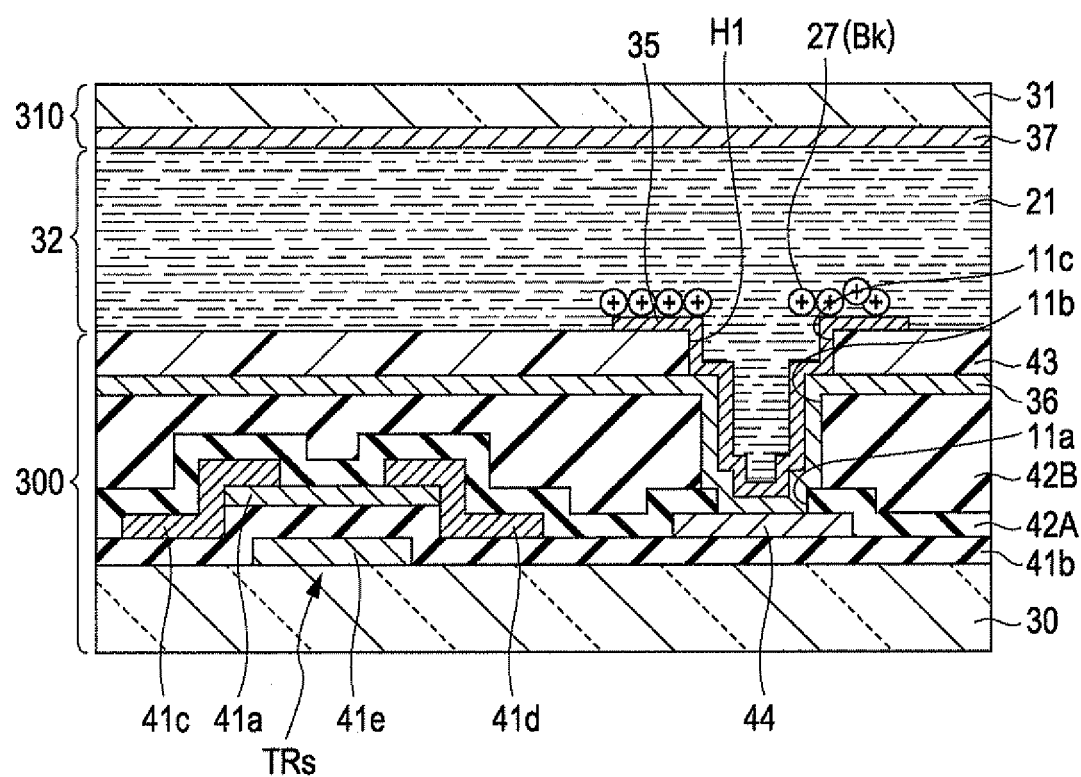
FIG. 3 is a cross-sectional diagram illustrating an outline configuration of the electrophoretic display device.

FIG. 3 is a cross-sectional diagram illustrating an outline configuration of the electrophoretic display device.

As illustrated in FIG. 3, the electrophoretic display device 100 has the electrophoretic layer 32 interposed between the element substrate 300 including the first substrate 30 and the pixel electrodes 35, and the opposing substrate 310 including the second substrate 31 and the opposing electrodes 37.

Figure 4:
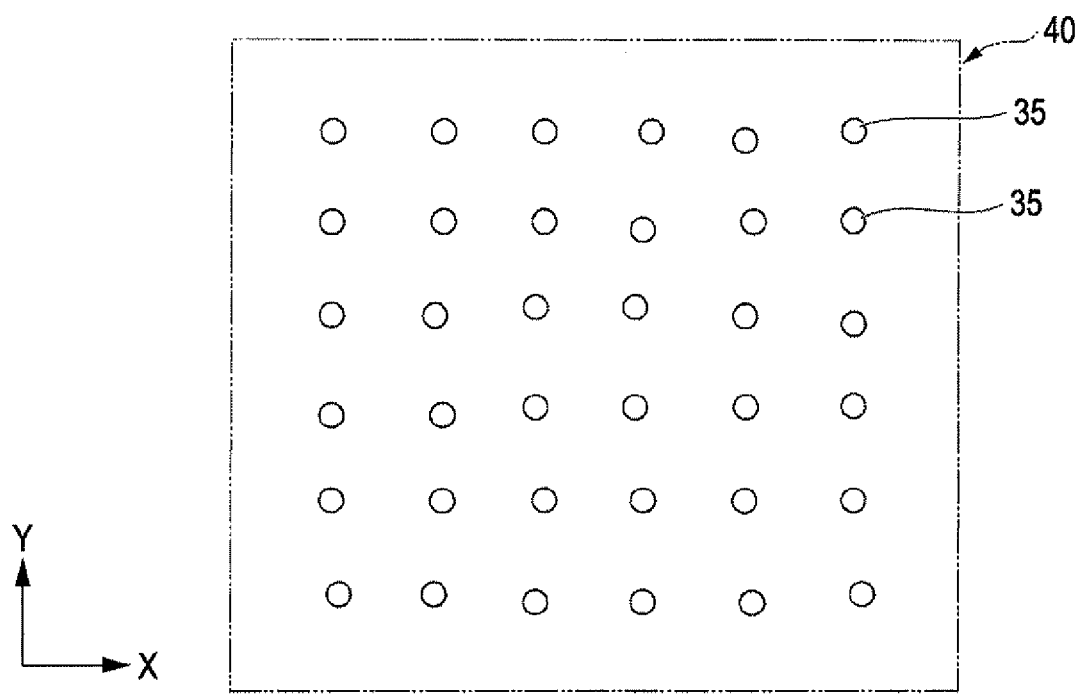
FIG. 4 is one example illustrating the layout of a pixel electrode of one pixel over an element substrate.

FIG. 4 is one example illustrating the layout of a pixel electrode of one pixel on an element substrate.

As illustrated in FIG. 4, a plurality of pixel electrodes 35 that is circular in plan view is arranged in the pixels 40. Here, although the arrangement of the pixel electrodes 35 may be at even intervals, by arranging in an irregular fashion, the appearance of display stripes where the boundaries of the pixel electrodes 35 appear as stripes can be prevented.

Figure 5:
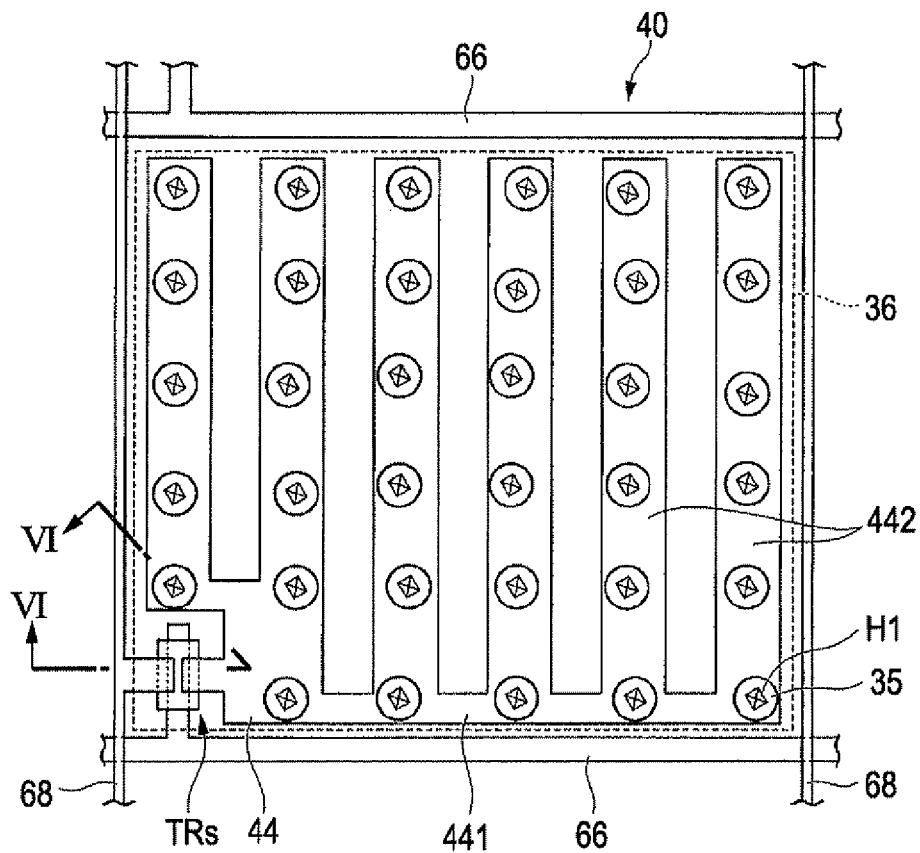
FIG. 5 is a plan diagram illustrating the configuration of above the element substrate of one pixel in more detail.
Figure 6:
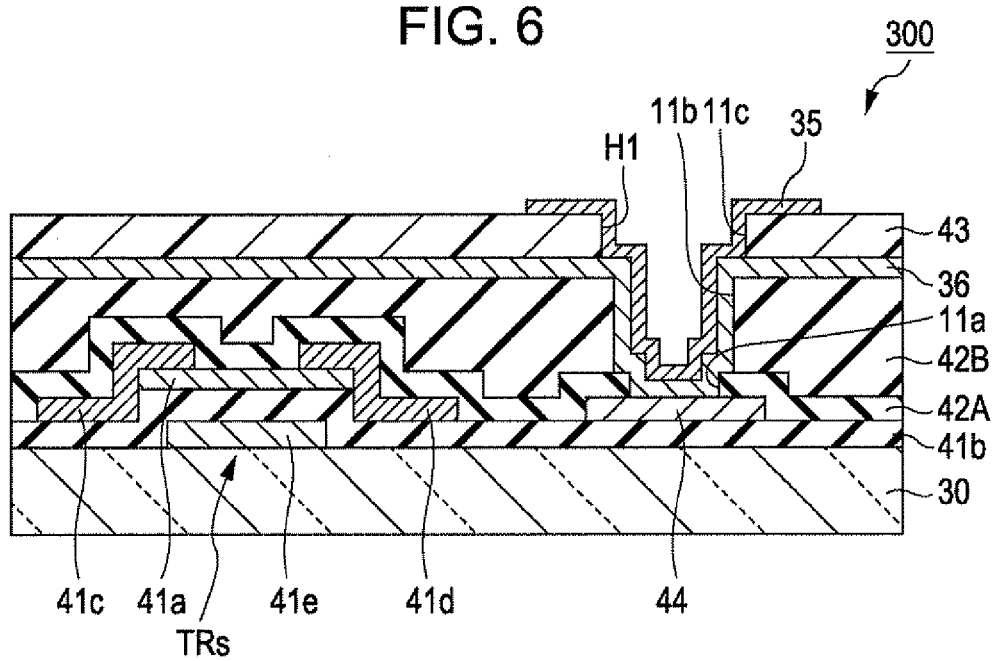
FIG. 6 is a cross-sectional diagram taken along line VI-VI in FIG. 5.

FIG. 5 is a plan diagram illustrating the configuration of above the element substrate of one pixel in more detail, and FIG. 6 is a cross-sectional diagram taken along line VI-VI in FIG. 5.

As illustrated in FIGS. 5 and 6, a selection transistor TRs, a connection electrode 44, a gate insulating film 41b, a first inter-layer insulating layer 42A, a second inter-layer insulating layer 42B, a reflecting electrode (reflecting layer) 36, a protective layer 43, and a plurality of electrodes 35 are provided for each pixel 40 over the first substrate 30.

A scan line 66 is connected to a gate, a data line 68 is connected to a source, and a connection electrode 44 is connected to a drain of the selection transistor TRs.

The connection electrode 44 is formed on the same layer as a source electrode 41c and a drain electrode 41d of the selection transistor TRs, includes a trunk portion 441 and a plurality of branch portions 442 linked by the trunk portion 441, and exhibits, as a whole, a comb shape in plan view. Further, although six branch portions 442 are shown in FIG. 5, the number of branch portions is not limited thereto.

Over the first substrate 30 is formed a gate electrode 41e that configures one portion of the selection transistor TRs for each pixel 40. The gate electrode 41e is composed of aluminum (Al) of a thickness of 300 nm. The gate insulating film 41b composed of a silicon oxide film is formed on the entire surface of the first substrate 30 covering the gate electrode 41e, and a semiconductor layer 41a composed of a-IGZO (oxides of In, Ga, Zn) of a thickness of 50 nm is formed directly above the gate electrode 41e.

Over the gate insulating film 41b is provided each of the source electrode 41c composed of Al of a thickness of 300 nm and the drain electrode 41d to partially overlap the gate electrode 41e and the semiconductor layer 41a. The source electrode 41c and the drain electrode 41d are formed to partially lie over the semiconductor layer 41a. Further, the connection electrode 44 similarly composed of aluminum (Al) of a thickness of 300 nm is formed over the gate insulating film 41b. The connection electrode 44 is pattern formed at the same time as the source electrode 41c and the drain electrode 41d, and is connected to the drain electrode 41d.

Here, a-Si TFT, poly-Si TFT, organic TFT, oxide TFT, and the like are usable as the selection transistor TRs. Both the top gate and bottom gate structures are possible as the structure.

In addition, the first inter-layer insulating layer 42A is formed over the first substrate 30 covering the drain electrode 41d, the source electrode 41c, and the connection electrode 44 of the selection transistor TRs. Over the first inter-layer insulating layer 42A is provided a through hole 11a that exposes one portion of the connection electrode 44 of a lower layer at a position that opposes the connection electrode 44. Above the first inter-layer insulating layer 42A is formed the second inter-layer insulating layer 42B covering the entire surface thereof.

The first inter-layer insulating layer 42A and the second inter-layer insulating layer 42B are composed of oxidized films or nitrogenized films, and are formed over the entire substrate face covering the selection transistor TRs and the connection electrode 44. On the surface of the second inter-layer insulating layer 42B is formed a reflecting electrode 36 of a size occupying substantially the entire pixel region for each pixel 40. In addition, the reflecting electrode 36 for every pixel is each connected to a pixel electrode 35, and is each provided independently.

The reflecting electrode 36 is connected to the connection electrode 44 that is exposed from through holes 11a and 11b via the through holes 11a and 11b that are formed penetrating the first inter-layer insulating layer 42A and the second inter-layer insulating layer 42B. The reflecting electrode 36 exhibits a substantially rectangular shape in plan view following the shape of the pixel regions. The reflecting electrode 36 is formed using a reflective material of metal or the like such as Al, and has the function of reflecting light incident from the opposing substrate 310 side and returning the light once again to the opposing substrate 310 side. Over the reflecting electrode 36 is formed the protective layer 43 having light permeability covering the entire surface of the first substrate 30.

The protective layer 43 is composed of photosensitive acryl of a thickness of 3 μm, and also functions as a planarizing layer. Through holes 11c that form contact holes H1 along with the through holes 11a and 11b described above are formed at positions of the protective layer 43 corresponding to the connection electrodes 44. On the surface of the protective layer 43 is formed a plurality of pixel electrodes 35 for each pixel 40.

The pixel electrodes 35 are formed, via the through holes 11c formed on the protective layer 43, covering the surface of the reflecting electrodes 36 that are present inside the through holes 11b, and are in a state of connection (contact) with the reflecting electrodes 36. That is, each pixel electrode 35 is electrically connected to the connection electrode 44 of the lower layer via the contact hole H1, and a predetermined voltage is applied to each pixel electrode 35 by a switching operation of the selection transistor TRs.

A pixel electrode 35 is formed in a circular shape in plan view, and the diameter thereof is set to a shorter length than a cell gap (the distance between a pixel electrode 35 and an opposing electrode 37), desirably set to a length that is equal to or less than one half of the cell gap in the embodiment. In so doing, the size of the smallest dot when seen from the second substrate 31 side can be made small and a bright display is possible. This is because the area of the pixel electrode 35 is contracted and the area of the reflecting electrode 36 is expanded. Here, although the pixel electrode 35 is formed in a circular shape in plan view, the shape may be polygonal. Further, the total area of a plurality of pixel electrodes 35 arranged inside one pixel is preferably equal to or less than one quarter of the area of one pixel.

Here, the pixel electrodes 35 are composed of ITO of a thickness of 50 nm, the second inter-layer insulating layer 42B is composed of a nitrogenized silicon film of a thickness of 300 nm, the protective film 43 is composed of photosensitive acryl of a thickness of 1 μm, the connection electrodes 44 and the reflecting electrodes 36 are composed of Al of a thickness of 300 nm, and the first substrate 30 is composed of glass or a PET base material of a thickness of 0.5 mm.

Returning to FIG. 3, the opposing substrate 310 that opposes the element substrate 300 via the electrophoretic layer 32 is configured to include the second substrate 31 and the opposing electrodes 37 that cover substantially the entire surface (inner surface opposing the first substrate 30) thereof. The opposing electrodes 37 cover the pixel electrodes 35 and the reflecting electrodes 36 in plan view, are formed larger than the pixel electrodes 35 and the reflecting electrodes 36, and here, are formed over a region covering portions of the second substrate 31 that at least contribute to displaying.

Here, the opposing electrodes 37 are composed of ITO of 100 nm, and the second substrate 31 is composed of glass or a PET base material of a thickness of 0.5 mm.

Here, the materials of the pixel electrodes 35 and the opposing electrodes 37 are selected in order that the Fermi level difference thereof is small. This is because the difference becomes a DC voltage and induces corrosion of the electrodes. For example, it is known that corrosion occurs with ITO or Al. For this reason, it is most desirable that, for example, the materials of both electrodes are the same. In addition, a configuration in which the pixel electrodes 35 are not used in FIG. 3 is also possible. However, since the reflecting electrodes 36 and the opposing electrodes 37 are opaque and transparent electrodes, and are therefore of different materials, a configuration equipped with the pixel electrodes 35 is preferable.

Further, the materials, thicknesses, and the like stated above are not limited thereto.

Between the element substrate 300 and the opposing substrate 310 is arranged a sealing material (not shown). The same material as the sealing material of a liquid crystals device is used as the material, and a UV cured acryl type material is used. Alternatively, a heat cured epoxy resin may be used. Further, in a region surrounded by the element substrate 300, the opposing substrate 310, and the sealing material is enclosed an electrophoretic material.

The electrophoretic layer 32 arranged between the element substrate 300 and the opposing substrate 310 has numerous black positively charged particles (colored particles) 27 (Bk) that are positively charged mixed in a transparent dispersion medium 21. Charged particles such as the positively charged particles 27 (Bk) act as electrophoretic particles within the electrophoretic layer 32. The electrophoretic particles move based on the electric potential difference of the pixel electrodes 35 and the opposing electrodes 37.

Next, the operating principles of an electrophoretic display device of a single particle system will be described.

Figure 7A:
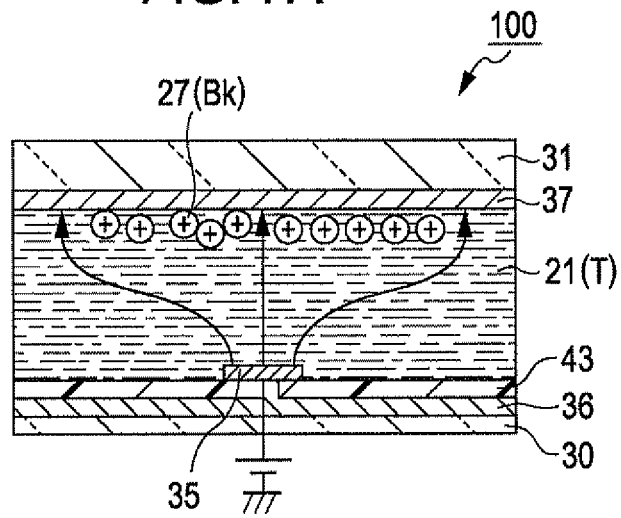
FIG. 7 is an explanatory diagram illustrating a case when the distribution state of positively charged particles is different depending on the level of the voltage applied to a pixel electrode.
Figure 7B:
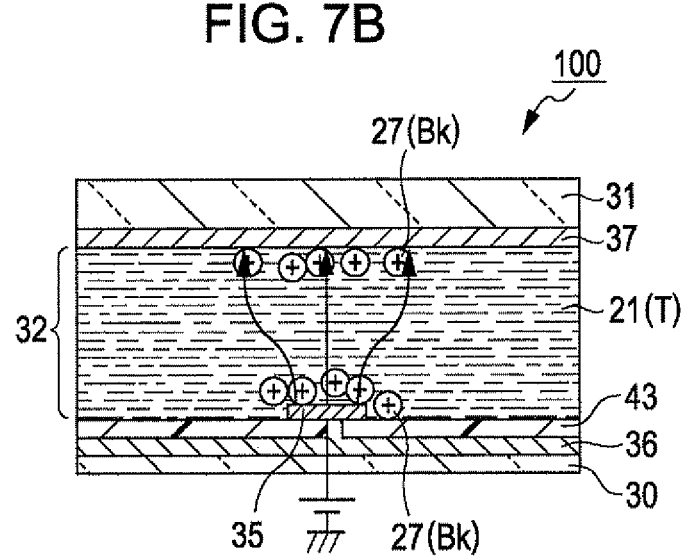

FIGS. 7A and 7B are explanatory diagrams illustrating a case when the distribution state of positively charged particles is different depending on the level of the voltage applied to a pixel electrode.

How the positively charged particles 27 (Bk) are arranged over the opposing electrodes 37 in a case when electric potentials of different magnitudes are input to the pixel electrodes 35 will be considered. A ground electric potential is input to the opposing electrodes 37 as a common electric potential. The same voltage as the pixel electrodes 35 is applied to the reflecting electrodes 36 of the embodiment.

Here, first, a negative voltage is applied to the pixel electrodes 35, and after all of the positively charged particles 27 (Bk) are electrically adsorbed above the pixel electrodes 35, a positive voltage of a different magnitude is applied to the pixel electrodes 35 and the distribution state of the positively charged particles 27 (Bk) inside the electrophoretic layer 32 is controlled. At this time, the protective layer 43 is formed over the reflecting electrodes 36 and the voltage applied to the positively charged particles 27 (Bk) is reduced by the amount which the layer contributes. The voltage of the pixel electrodes 35 is applied to the positively charged particles 27 (Bk) as is. Thereby, it is possible to efficiently adsorb the positively charged particles 27 (Bk) over the pixel electrodes 35.

In addition, out of the positive voltages applied to the pixel electrodes 35, with the electric potential of the opposing electrodes 37 as a reference, a voltage of which the absolute value becomes the maximum is referred to as a positive voltage VH (hereinafter also referred to as a maximum value of positive), and a voltage of which the absolute value becomes the maximum out of the negative voltages is referred to as a negative voltage VL (hereinafter also referred to as a maximum value of negative).

Here, "to supply a voltage to the electrodes" has the same meaning as "to supply an electric potential of a sort that would cause an electric potential between a ground electric potential to the electrodes".

As illustrated in FIG. 7A, if a high positive voltage VH (maximum value of positive) is applied to the pixel electrodes 35, a large electric field is generated between the pixel electrodes 35 and the opposing electrodes 37 by an electric field caused by an electric potential difference (voltage) between an electric potential corresponding to the positive voltage VH and the ground electric potential of the opposing electrodes 37. Thereby, almost all of the positively charged particles 27 (Bk) typically move to the opposing electrode 37 side.

In addition, the positively charged particles 27 (Bk) are dispersed over a wide range in a direction parallel to the second substrate 31 by an oblique electric field from the pixel electrodes 35 (an electric field having a line of electric force emanating from the pixel electrodes 35 in a direction tilted against the normal line of the first substrate 30). Accordingly, a black display can be expressed over the entirety of a pixel in FIG. 7A.

On the other hand, as illustrated in FIG. 7B, since if a positive voltage of an approximately moderate level Vh ($|Vh|<|VH|$) is applied to the pixel electrodes 35, the electric potential difference (voltage) between the pixel electrodes 35 and the opposing electrodes 37 becomes smaller than the case of FIG. 7A, positively charged particles 27 (W) are distributed without spreading much at the opposing electrode 37 side. This is for the following reasons.

That is, although the positively charged particles 27 (Bk) do also move by an oblique electric field, since the original electric field is not large, the oblique electric field is not large either. Accordingly, the movement amount of the positively charged particles 27 (Bk) in the direction parallel to the second substrate 31 is lessened, and a clustered distribution whereby the positively charged particles 27 (Bk) are concentrated within a narrow range can be realized. Further, the number of particles that move is also reduced. Accordingly, here, a black display can be expressed over a smaller area than that illustrated in FIG. 7A.

In addition, since the same electric potential as the pixel electrodes 35 is input to the reflecting electrodes 36, the positively charged particles 27 (Bk) are not adsorbed over the reflecting electrodes 36 and are moved smoothly to the opposing electrode 37 side.

Here, since in a case when the positively charged particles 27 (Bk) are not moved to the opposing electrode 37 side, that is, in a case when a negative voltage is applied to the pixel electrodes 35 and all of the positively charged particles 27 (Bk) are gathered over the pixel electrodes 35, the color of the light (white light) reflected by the reflecting electrodes 36 via a transparent dispersion medium 21 (T) can be seen from the second substrate 31 side, the entirety of the pixels becomes a white display.

Here, in the embodiment, a clearer white display is obtained by the light incident from the opposing substrate 310 being reflected by the reflecting electrodes 36 arranged on the first substrate 30 side.

By controlling the number and distribution state (distribution region) of positively charged particles 27 (Bk) distributed over the opposing electrodes 37, the display of a black display or a white display, or an intermediate gradation between black and white can be controlled. In addition, by providing a plurality of the pixel electrodes 35 in an island shape in one pixel, the display can be controlled with greater controllability.

Next, the actual display operation by the electrophoretic display device of a single particle system will be described.

Figure 8A:
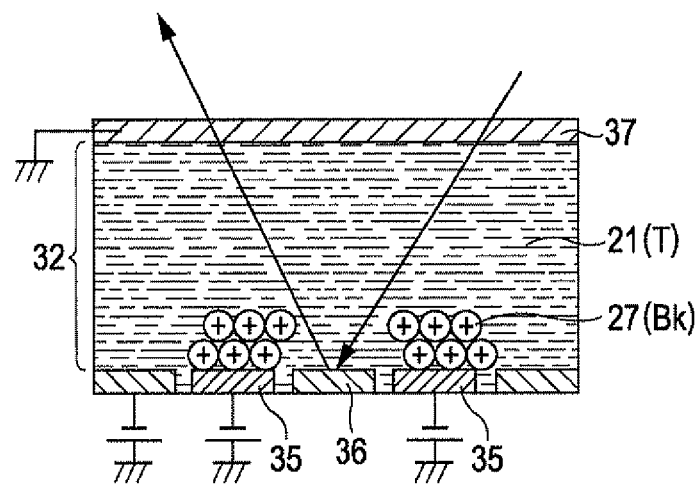
FIG. 8 is a cross-sectional diagram illustrating the distribution state of particles for each display color.
Figure 8B:
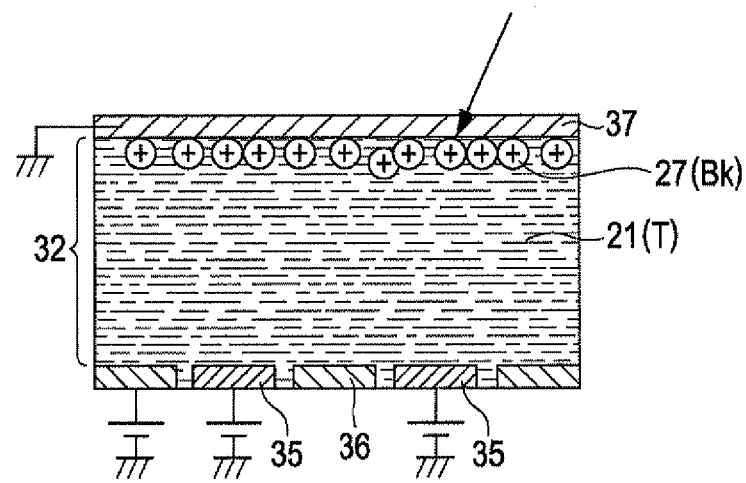
Figure 8C:
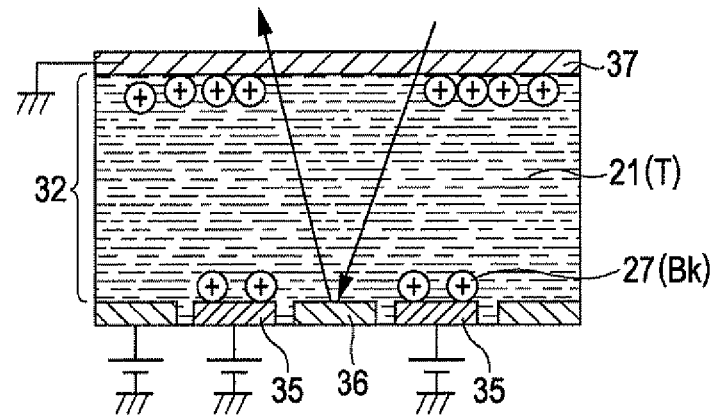

FIGS. 8A to 8C are cross-sectional diagrams illustrating the distribution state of particles for each display color. FIG. 9 is a plan diagram illustrating the distribution state of particles for each display color. Here, FIGS. 8A to 8C are illustrated focusing attention on one pixel, and the number of pixel electrodes 35 within each pixel and the protective layer 43 as an insulating film above the reflecting electrodes 36 are omitted. Here, the ground electric potential is input to the opposing electrodes 37. Similarly to FIG. 7, the same voltage as that of the pixel electrodes 35 is applied to the reflecting electrodes 36.

FIG. 8A illustrates the distribution state of particles during a white display.

Here, a negative voltage VL is applied to each pixel electrode 35. The positively charged particles 27 (Bk) that are positively charged are then adsorbed above each pixel electrode 35. Light incident from the outside is reflected by the reflecting electrodes 36 present in the vicinity of the pixel electrodes 35 and is emitted from the opposing electrode 37 side. That is, since all of the positively charged particles 27 (Bk) are adsorbed above the pixel electrodes 35, the light incident from the opposing electrode 37 side is reflected by the reflecting electrodes 36 and returns to the opposing electrode 37 side.

Figure 9A:
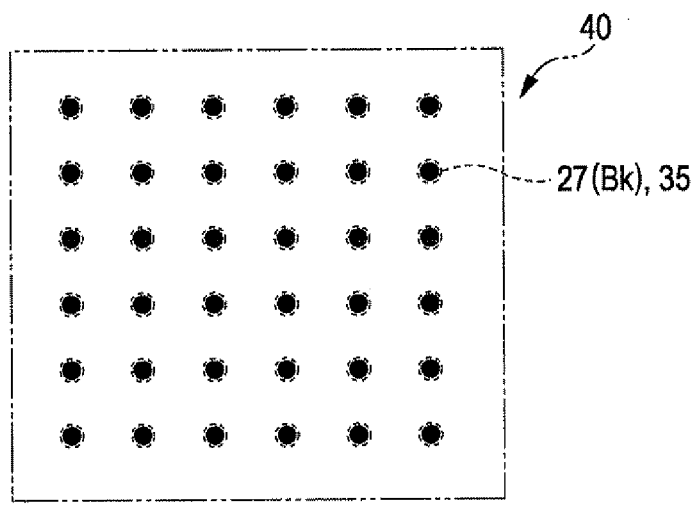
FIG. 9 is a plan diagram illustrating the distribution state of particles for each display color.

Accordingly, if the electrophoretic layer 32 is seen from the opposing electrode 37 side in this state, the entirety of the pixels becomes a white display (preset state) by the reflected light (FIG. 9A).

FIG. 8B illustrates the distribution state of particles during a black display.

Figure 9B:
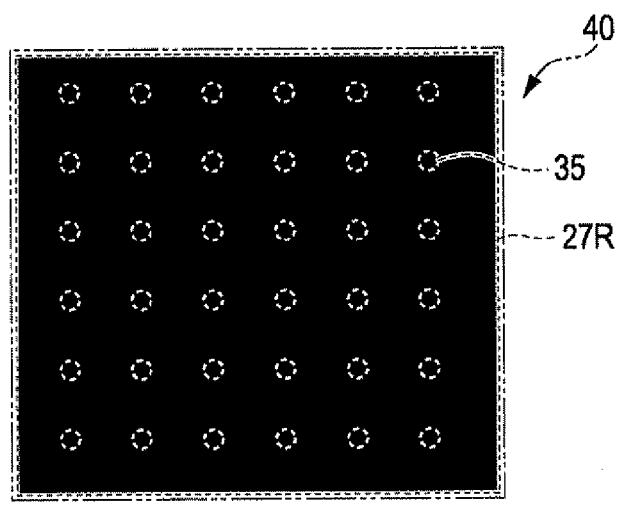

In a case when switching from a white display to a black display, a positive voltage VH is applied to each pixel electrode 35. The positively charged particles 27 (Bk) that are positively charged then all move to the opposing electrode 37 side, and are distributed two-dimensionally or three-dimensionally. A distribution region 27R of black positively charged particles 27 (Bk) occupies the entire pixel regions. Accordingly, since light incident from the outside is absorbed by the positively charged particles 27 (Bk) distributed over the opposing electrodes 37, a black display is displayed (FIG. 9B).

FIG. 8C illustrates the distribution state of particles during a gray display.

Here, a predetermined voltage is first applied to the pixel electrodes 35 from the state illustrated in FIG. 8A.

If a positive voltage Vh that is smaller than the positive voltage VH applied when a black display is performed (|Vh|<|VH|) is applied to the pixel electrodes 35 in a state where all of the positively charged particles 27 (Bk) are adsorbed above each pixel electrode 35 (preset state), a portion of the positively charged particles 27 (Bk) above the pixel electrodes 35 is moved to the opposing electrode 37 side. In so doing, a plurality of small black dots is formed in a predetermined region above the opposing electrodes 37 opposing the pixel electrodes 35, and the dispersion medium 21 is present between the black dots. Here, a black display by the positively charged particles 27 (Bk) occupies an area approximately one half of the entire pixel region. Further, an area of the region other than the distribution region 27R of the positively charged particles 27 (Bk), that is, an area approximately one half of the entire pixel region, is occupied by a white display. By the light that permeates the dispersion medium 21 (T) between the black dots and that is reflected by the reflecting electrodes 36 returning to the opposing electrode 37 side, white can be expressed in the region.

Figure 9C:
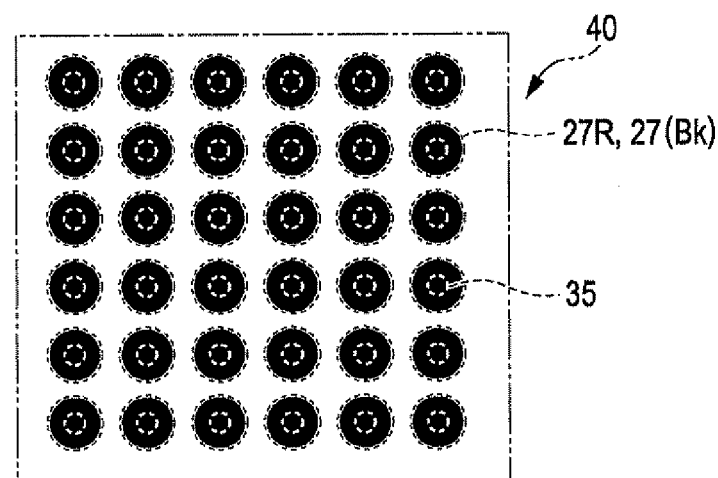

Above the opposing electrodes 37, since the positively charged particles 27 (Bk) are two-dimensionally or three-dimensionally distributed and the black dot region by the positively charged particles 27 (Bk) and the white region by the reflected light are mixed, if the electrophoretic layer 32 is seen from the opposing electrode 37 side in this state, gray is displayed overall. That is, the incident light includes a component that is absorbed by the black positively charged particles 27 (Bk) and a component that is reflected by the reflecting electrodes 36, and if the components are added, gray is displayed overall (FIG. 9C).

In other words, since a portion of the reflecting electrodes 36 is partially hidden by the positively charged particles 27 (Bk) present above the opposing electrodes 37 and the light emitting amount of reflected light emitted from the opposing substrate 310 side is reduced, a gray display in which the brightness is subdued is displayed.

In addition, control of the movement amount of the positively charged particles 27 (Bk) to the opposing electrode 37 side and the distribution range is possible through design factors such as the distances between the pixel electrodes 35, the opposing electrodes 37, and the reflecting electrodes 36, the size of the pixel electrodes 35, and the like, and through the voltage applied. Further, although the movement amount and the distribution range of the positively charged particles 27 (Bk) are controlled by the level of voltage applied to each pixel electrode 35 in the description above, control is also possible by the length of time that a voltage is applied.

Control of the brightness is performed by the area of particles visible when the electrophoretic layer 32 is seen from the outside of the opposing electrodes 37. The visible area indicates the effective area including the two-dimensional and three-dimensional distributions of the particles that is actually visible.

Here, in the display state described above, although a completely black display or white display is not displayed in the vicinity of the distribution region of the black positively charged particles 27 (Bk) and the reflecting region of white, the gradation is controlled by the effective area of when the distribution region of the positively charged particles 27 (Bk) is seen, and control of the brightness and saturation is performed.

In this manner, as a result, the brightness, saturation, or gray display are controlled by the movement amount visible when the electrophoretic layer 32 is seen from the outside of the opposing electrodes 37 and by the effective area of the distribution of the positively charged particles 27 (Bk).

Here, although a subsequent display is performed from the preset state of a white display in the description above, the subsequent display may be performed from the preset state of a black display. The preset state of a black display is obtained, as illustrated in FIG. 8B, by applying the positive voltage VH to the pixel electrodes 35. When transitioning from a black display to a subsequent display, display is performed by applying a negative voltage to the pixel electrodes 35 and controlling the amount of black positively charged particles 27 (Bk) extracted from the opposing electrodes 37.

Since the electrophoretic particles present in the electrophoretic layer 32 are solely the black positively charged particles 27 (Bk), regardless of which presetting operation out of the white display presetting operation or the black display presetting operation is used, a DC voltage is applied between the opposing electrodes 37 and the pixel electrodes 35 if only the presetting operation of one of the display colors is continually used. This is because a high voltage is inevitably applied to the pixel electrodes 35 when presetting, and a voltage with the opposite polarity and of which the absolute value is equal to or less than the equivalent is applied when writing an image.

If a DC voltage is applied between the opposing electrodes 37 and the pixel electrodes 35, corrosion of the electrodes and deterioration in the electrophoretic material are caused. In order to avoid these, the white display presetting operation (FIG. 8A) and the black display presetting operation (FIG. 8B) may be switched for every time or every plurality of times that rewriting of the image is carried out.

FIG. 10 is a timing chart of when the electrophoretic display device of a single particle system is driven.

The ground electric potential (Vcom) is applied to the opposing electrodes 37, and a predetermined voltage is applied to the pixel electrodes 35 in this state.

Gray Display

As illustrated in FIG. 10, during a presetting period T11, by first applying a selection voltage Vgh to the scan lines 66 and applying the negative voltage VL (maximum value of negative) to each pixel electrode 35 via the data line 68, all of the positively charged particles 27 (Bk) are adsorbed above each pixel electrode 35 as illustrated in FIG. 8A. In so doing, an initial state is obtained by displaying white within the pixels 40.

During a writing period T12, by applying the selection voltage Vgh to the scan lines 66 and applying the positive voltage Vh (|Vh|<|VH|) to each pixel electrode 35 via the data line 68, a portion of the positively charged particles 27 (Bk) adsorbed to the pixel electrodes 35 is moved to the opposing electrode 37 side, as shown in FIG. 8C. In so doing, black dot regions and white regions that are mixed are visible when seen from the opposing substrate 310 side, and a gray display is displayed.

During a display maintenance setting period T13, the selection voltage Vgh is applied to the scan lines 66, Vcom is applied to the pixel electrodes 35, and the electric potential of the data lines 68 and the pixel electrodes 35 is Vcom. The operation of the period T13 is hereby ended. During a display maintenance period T14 that follows, the pixel electrodes 35, the reflecting electrodes 36, and the opposing electrodes 37 are all made to be a high impedance (no voltage applied) state. In so doing, the display can be maintained without rewriting. Electric power is not consumed in this state.

The electric potential of the data lines 68, the pixel electrodes 35, and the opposing electrodes 37 is the same during the display maintenance setting period T13. This is to prevent the display from being rewritten, if the electric potential of the data lines 68 were to be different from that of the pixel electrodes 35, as a result of the electric potential of the data lines 68 being written in to the pixel electrodes 35 by a leak current by a light leak of the selection transistors TRs or the like during the period T14 that follows.

White Display

In a case when a white display is performed, first, white display presetting is carried out.

As illustrated in FIG. 10, during a presetting period T21, similarly to the presetting period T11 described above, the selection voltage Vgh is applied to the scan lines 66, and the negative voltage VL (maximum value of negative) is applied to each pixel electrode 35 via the data line 68. In so doing, as illustrated in FIG. 8A, all of the positively charged particles 27 (Bk) are adsorbed above each pixel electrode 35, white is displayed within the pixels 40, and the display is returned to the initial state.

The pixels 40 display white by the light incident from the opposing electrode 37 side becoming reflected by the reflecting electrodes 36.

During a write-in period T22, since a white display is displayed from the presetting period T21, the voltage (Vcom) for maintaining the white display is applied to the pixel electrodes 35.

Furthermore, in a subsequent display maintenance setting period T23, the same voltage as in T13 is applied. Moreover, a display maintenance period T24 is the same as T14.

Black Display

Here, black display presetting is carried out.

As illustrated in FIG. 10, during a presetting period T31, similarly to the presetting period T11 described above, the selection voltage Vgh is applied to the scan lines 66, and the positive voltage VH (maximum value of positive) is applied to each pixel electrode 35 via the data line 68. In so doing, as illustrated in FIG. 8B, the positively charged particles 27 (Bk) that are adsorbed over the pixel electrodes 35 are moved to the opposing electrode 37 side, and all of the positively charged particles 27 (Bk) are two-dimensionally or three-dimensionally distributed over the opposing electrodes 37. In this manner, by the positively charged particles 27 (Bk) distributed over the entire pixel region, black is displayed within the pixels 40.

During a write-in period T32, since a black display is displayed from the presetting period T31, the voltage (Vcom) for maintaining the black display is applied to the pixel electrodes 35.

Furthermore, in a subsequent display maintenance setting period T33, the same voltage as in T23 and T24 is applied.

As described above, in a case when different color displays are performed consecutively, instead of continually performing the presetting operation and the write-in operation, a maintenance operation may be executed between each operation. The maintenance state is effectively a state in which a voltage that rewrites the image is not applied to the pixel electrodes 35 from the outside.

In addition, the level of the applied voltage to the pixel electrodes 35 is an example. This is because the level of the applied voltage also changes depending on the distance between the pixel electrodes 35 and the opposing electrodes 37, the size of the pixel electrodes 35, and the electrophoretic material. Further, although black display presetting was used in T31, a black display may be performed after using white display presetting. In addition, white and black display presetting may be alternately switched. The cycle thereof may be either one of every screen or every plurality of screens.

Further, here, Vcom is not limited to the ground electric potential, and may mean a common electric potential or a reference electric potential.

As described above, in the embodiment, reflecting electrodes 36 that reflect light are provided to the element substrate 300 side. The light incident from the opposing substrate 310 side is reflected by the reflecting electrodes 36 and emitted to the observer side. The reflected light is white light, and a white display or gradation control of a display is possible through the control of the white light. Further, although Vcom is written in to the pixel electrodes 35 by conducting the selection transistors during the display maintenance setting period, as illustrated in FIG. 17 later, the data lines 68 may simply be Vcom.

Figure 14:
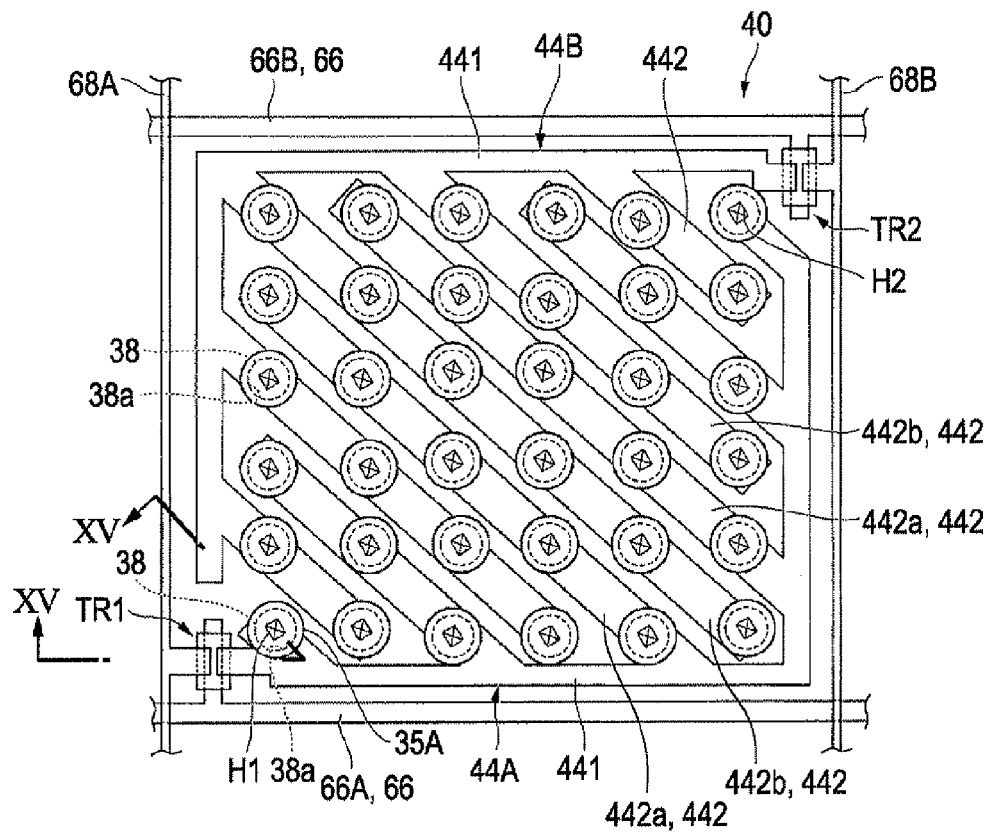
FIG. 14 is a plan diagram illustrating the configuration of the element substrate of one pixel of the electrophoretic display device in more detail.
Figure 15:
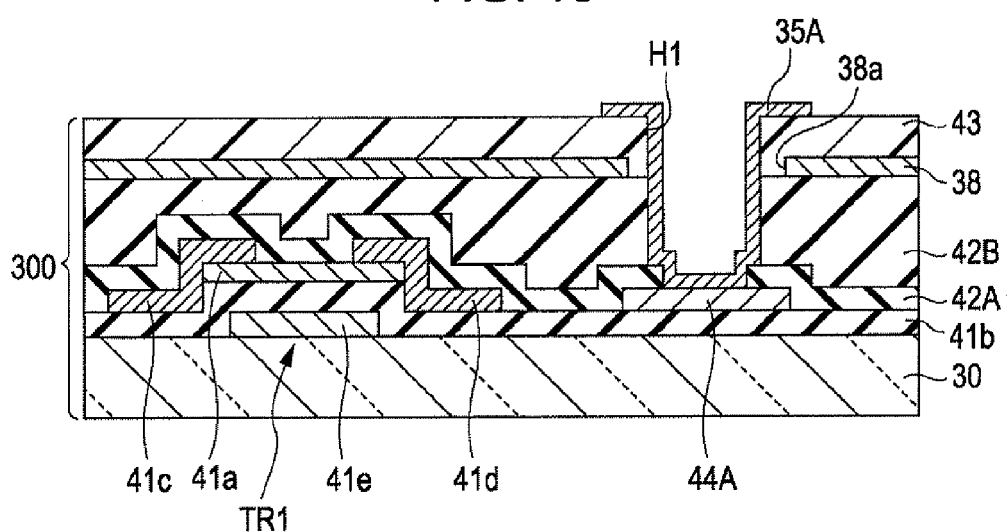
FIG. 15 is a cross-sectional diagram taken along line XV-XV in FIG. 14.

In addition, the reflecting electrodes 36 may be a configuration, as shown in FIGS. 14 and 15 described below, in which input of an independent electric potential is possible. For example, when the positively charged particles 27 (Bk) are adsorbed to the pixel electrodes 35, the same electric potential as the opposing electrodes 37 is applied, and when the positively charged particles 27 (Bk) are adsorbed to the opposing electrodes 37, a voltage of the same polarity as the pixel electrodes 35 is applied. In so doing, the positively charged particles 27 (Bk) can be repelled by the reflecting electrodes 36. The problem of the positively charged particles 27 (Bk) adsorbing to the reflecting electrodes 36 is thereby resolved.

In addition, by forming the reflecting electrodes 36 above the selection transistors TRs, incidence of light to the selection transistors TRs is prevented and the occurrence of operational failure can be prevented. Further, since light can also be reflected above the selection transistors TRs, the effective display region is effectively increased, and more light can be brought out.

According to the electrophoretic display device 100 of the embodiment, a brighter display with greater luminance can be obtained, and a display with favorable visual characteristics can be performed. The polarity of the charge of the colored particles may be positive or negative.

FIG. 11 is a diagram illustrating one pixel composed of a plurality of sub-pixels as an outline.

As illustrated in FIGS. 11A to 11E, one pixel may be configured by a plurality of sub-pixels. The colors corresponding to each sub-pixel S can be realized by changing the colors of the colored particles mixed into the electrophoretic layer 32 of each sub-pixel S as an electrophoretic material or by changing the colors of the dispersion medium.

Figure 11A:
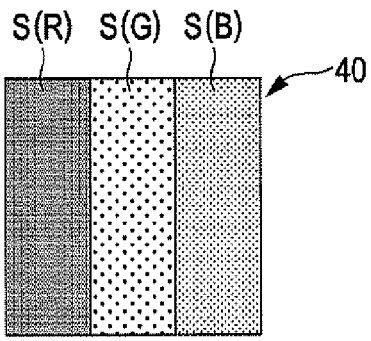
FIG. 11 is a diagram illustrating one pixel composed of a plurality of sub-pixels as an outline.

The pixel 40 illustrated in FIG. 11A is configured by three sub-pixels S (R), S (G), and S (B) of R (red), G (green), and B (blue). Each sub-pixel S (R), S (G), and S (B) that exhibits a rectangular shape in plan view is arranged lined up to be parallel to each other in the lengthwise direction.

Figure 11B:
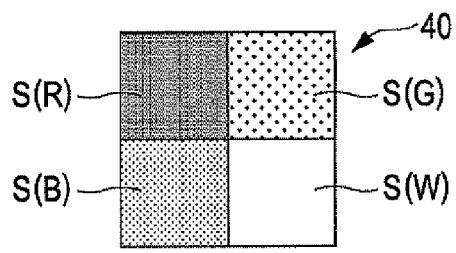

The pixel 40 illustrated in FIG. 11B is configured by four sub-pixels S (R), S (G), S (B), and S (W) of R (red), G (green), B (blue), and W (white). Each sub-pixel S (R), S (G), S (B), and S (W) that exhibits a rectangular shape in plan view is arranged in a 2×2 matrix form.

Figure 11C:
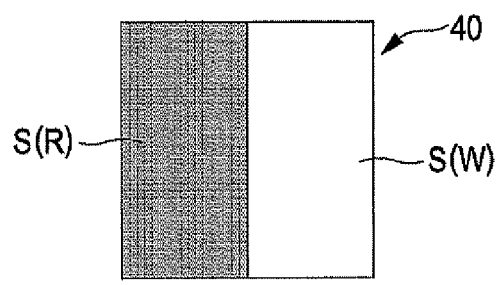

The pixel 40 illustrated in FIG. 11C is configured by two sub-pixels S (R) and S (W) of R (red) and W (white).

Figure 11D:
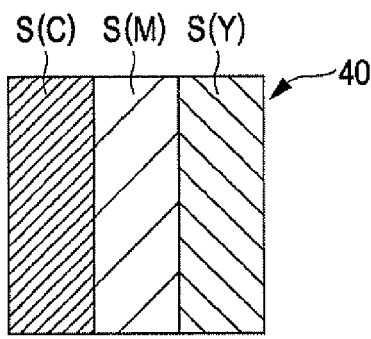

The pixel 40 illustrated in FIG. 11D is configured by three sub-pixels S (C), S (M), and S (Y) of C (cyan), M (magenta), and Y (yellow).

Figure 11E:
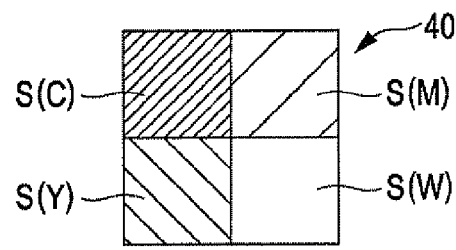

The pixel 40 illustrated in FIG. 11E is configured by four sub-pixels S (C), S (M), S (Y), and S (W) of C (cyan), M (magenta), Y (yellow), and W (white).

Second Embodiment

Next, as an electrophoretic display device of a second embodiment, the configuration of a two-particle system electrophoretic display device will be described.

Figure 12:
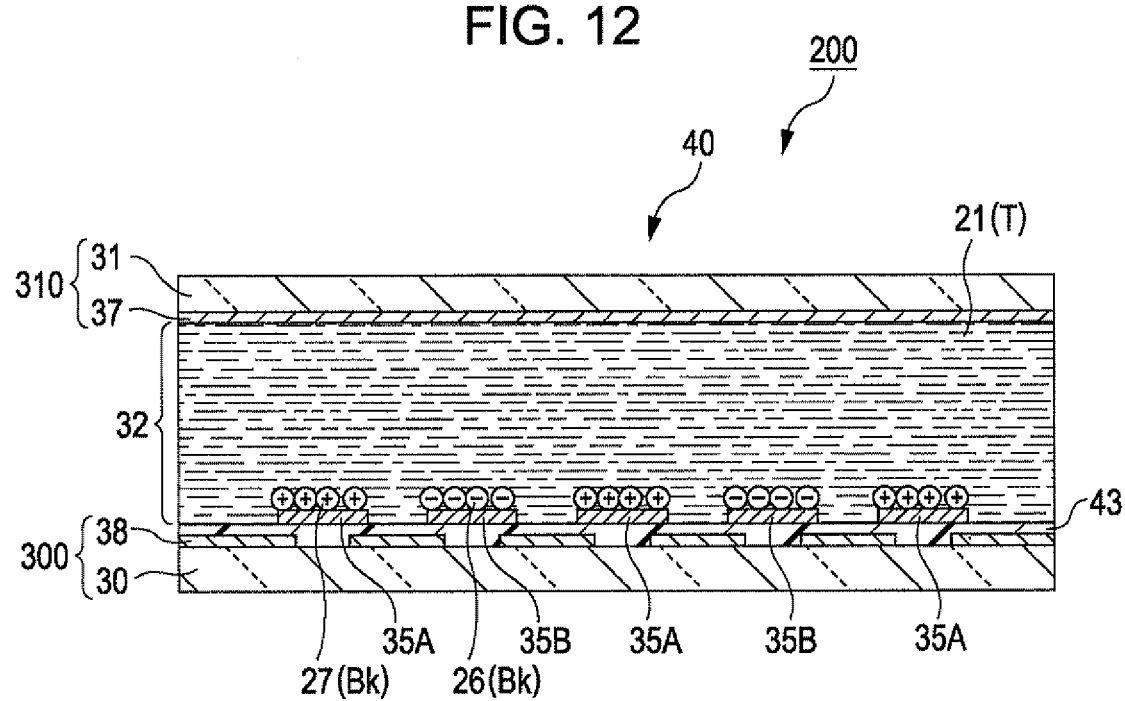
FIG. 12 is a cross-sectional diagram illustrating an outline configuration of one pixel of an electrophoretic display device of a second embodiment.

FIG. 12 is a cross-sectional diagram illustrating an outline configuration of one pixel of an electrophoretic display device of the second embodiment.

As illustrated in FIG. 12, the electrophoretic display device 200 of the embodiment holds the two-particle system electrophoretic layer 32 between the element substrate 300 and the opposing substrate 310. The electrophoretic layer 32 has black positively charged particles (first colored particles) 27 (Bk) that are negatively charged and black negatively charged particles (second colored particles) 26 (Bk) mixed in the transparent dispersion medium 21 (T). The positively and negatively charged particles 26 and 27 act as electrophoretic particles in the electrophoretic layer 32.

Furthermore, the positively charged particles 27 (Bk) are gathered above the pixel electrodes (first electrodes) 35A if a negative voltage is applied to the pixel electrodes 35A, and the negatively charged particles 26 (Bk) are gathered above the pixel electrodes 35B if a positive voltage is applied to the pixel electrodes (second electrodes) 35B.

Here, the ground electric potential is input to the opposing electrodes 37 as common electrodes, and the reflecting electrodes (reflecting layer) 38 have the same electric potential as the opposing electrodes 37.

Moreover, by controlling the level of voltage applied to each of the pixel electrodes 35A and the pixel electrodes 35B, the gradation is controlled by the area of the negatively charged particles 26 (Bk) and the area of the positively charged particles 27 (Bk) when the electrophoretic layer 32 is seen from the opposing electrode 37 side.

Figure 13:
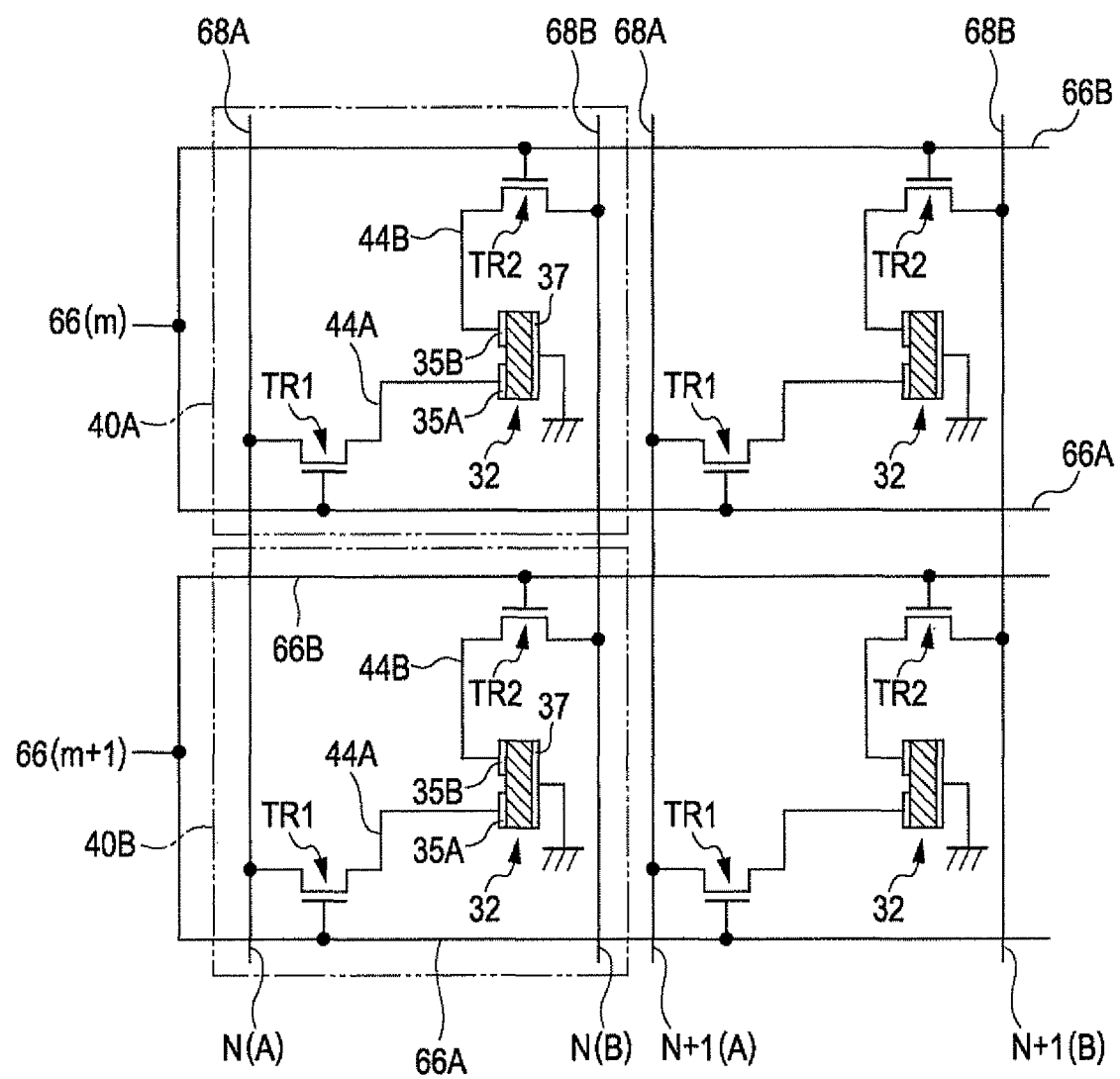
FIG. 13 is an equivalent circuit diagram illustrating the overall configuration of the electrophoretic display device.

FIG. 13 is an equivalent circuit diagram illustrating the overall configuration of the electrophoretic display device 200.

As illustrated in FIG. 13, the electrophoretic display device 200 is provided with a plurality of scan lines 66 (m, m+1, ... ), a plurality of first data lines 68A (N(A), N+1(A), ... ), and a plurality of second data lines 68B (N(B), N+1(B), ... ) above the first substrate 30. Here, the scan lines 66 of the embodiment include the first scan lines 66A and the second scan lines 66B that split into two in the display region.

In each pixel 40A and 40B are provided two selection transistors (first transistors) TR1, a selection transistor (second transistor) TR2, the electrophoretic layer 32 as an electrophoretic material, two pixel electrodes (first electrodes) 35A and pixel electrodes (second electrodes) 35B, an opposing electrode 37, a connection electrode (first connection electrode) 44A, and a connection electrode (second connection electrode) 44B.

With a selection transistor TR1, the first scan line 66A is connected to the gate, the first data line 68A is connected to the source, and the pixel electrode 35A is connected to the drain via the connection electrode 44A.

With a selection transistor TR2, the second scan line 66B is connected to the gate, the second data line 68A is connected to the source, and the pixel electrode 353 is connected to the drain via the connection electrode 44B.

In the pixel 40A out of the pixels 40A and 40B that are next to each other in the extending direction of the data line 68, m rows of scan lines 66 are connected to the gate of each of the selection transistor TR1 (first transistor) and the selection transistor TR2 (second transistor), N (A) rows of first data lines 68A are connected to the source of the selection transistor TR1, and N (B) rows of second data lines 68B are connected to the source of the selection transistor TR2.

Here, a configuration in which one of the electrodes is provided with a storage capacitor connected to the drain of the selection transistors TR1 and TR2 and the pixel electrodes 35A and 35B (electrophoretic layer 32) is also possible. Furthermore, a storage capacitor line may be provided and the other electrode of the storage capacitor may be connected to the storage capacitor line. Further, a means other than a storage capacitor of applying a voltage to the electrophoretic layer 32 may be equipped.

The connection electrode 44A is connected to a plurality of pixel electrodes 35A while being connected to the drain of the selection transistor TR1, and the connection electrode 44B is connected to a plurality of pixel electrodes 35B while being connected to the drain of the selection transistor TR2.

FIG. 14 is a plan diagram illustrating the configuration of the element substrate of one pixel of the electrophoretic display device in more detail, and FIG. 15 is a cross-sectional diagram taken along line XV-XV in FIG. 14.

In the embodiment, since the configuration of the element substrate 300 side is different from the previous embodiment, the configuration of the element substrate 300 will be mainly described.

As illustrated in FIG. 14, the electrophoretic display device 200 has a plurality of pixel electrodes 35A and 35B, two selection transistors TR1 and TR2, and two connection electrodes 44A and 44B formed for each pixel 40 that are formed on a surface of the electrophoretic layer 32 side of the first substrate 30 that configures the element substrate 300.

The pixel electrodes 35A and 35B are each provided in plurality in one pixel, and are pattern arranged alternately along two directions along the scan lines 66A and 66B and the data lines 68A and 68B. Each of the plurality of the pixel electrodes 35A is connected to each other by the connection electrode 44A having a comb shape in plan view, and each of the plurality of pixel electrodes 35B is connected to each other by the connection electrode 44B having a comb shape in plan view.

The drain electrode 41d of the selection transistor TR1 is connected to a plurality of pixel electrodes 35A via the connection electrode 44A, and the drain electrode 41d of the selection transistor TR2 is connected to a plurality of pixel electrodes 353 via the connection electrode 44B. Further, a data electric potential from the first data line 68A is applied to the plurality of pixel electrodes 35A via the selection transistor TR1, and a data electric potential from the second data line 68B is applied to the plurality of pixel electrodes 35B via the selection transistor TR2. In so doing, it is a configuration in which the plurality of pixel electrodes 35A and the plurality of pixel electrodes 35B are drivable independently of each other.

Each connection electrodes 44A and 44B has a comb shape in plan view as described above, is composed of two sides that extend along two directions (for example, the extending direction of the scan lines 66A and 66B, or of the data lines 68A and 68B), and includes the trunk portion 441 that is L-shaped as a whole and a plurality of branch portions 442 that is linked to the trunk portion 441. Each of the plurality of branch portions 442 extends parallel to each other in an oblique direction different from the extending direction of the trunk portion 441 (here, a direction that is approximately 45° to 60° against each side of the branch portions 442. A direction that is substantially 45° in FIG. 14), and all of the extending lengths of the branch portions 442 are different. Specifically, the branch portion 442 that extends from near the corner portion (bent portion) of the trunk portion 441 is the longest, and the branch portions 442 further away from the trunk portion 441 have shorter lengths.

The connection electrodes 44A and 44B exhibiting a comb shape in plan view are arranged in the pixel 40 interlocking with each other, and are in a state where branch portions 442b and 442b of the connection electrode 44B are present on both sides of a branch portion 442a of the connection electrode 44A.

Each branch portion 442a of the connection electrode 44A corresponds to the plurality of pixel electrodes 35A, and each branch portion 442b of the connection electrode 44B corresponds to the plurality of pixel electrodes 35B.

The connection electrodes 44A (44B) between the plurality of pixel electrodes 35A (35B) may be formed in a thinner pattern than the region forming the contact holes H1 (H2). This is because the capacity between the connection electrodes 44A (44B) and the reflecting electrodes 38 decreases.

As illustrated in FIG. 15, above the first substrate 30 composed of a glass substrate of a thickness of 0.6 mm is formed the gate electrode 41e configuring a portion of the selection transistor TR1 (selection transistor TR2) for each pixel 40. The gate electrode 41e is composed of aluminum (Al) of a thickness of 300 nm. The gate insulating film 41b composed of a silicon oxide film of a thickness of 300 nm is formed over the entire surface of the first substrate 30 covering the gate electrode 41e, and the semiconductor layer 41a composed of a-IGZO (oxides of In, Ga, Zn) of a thickness of 50 nm is formed directly above the gate electrode 41e.

Over the gate insulating film 41b is provided each of the source electrode 41c composed of Al of a thickness of 300 nm and the drain electrode 41d to partially overlap the gate electrode 41e and the semiconductor layer 41a. The source electrode 41c and the drain electrode 41d are formed to partially lie over the semiconductor layer 41a. Further, the connection electrode 44A (connection electrode 44B) similarly composed of aluminum (Al) of a thickness of 300 nm is formed over the gate insulating film 41b. The connection electrode 44A (connection electrode 44B) is pattern formed at the same time as the source electrode 41c and the drain electrode 41d, and is connected to the drain electrode 41d.

Here, a-Si TFT, poly-Si TFT, organic TFT, oxide TFT, and the like are usable as the selection transistors TR1 (TR2). Both the top gate and the bottom gate structures are possible as the structure.

The first inter-layer insulating layer 42A composed of a silicon oxide film of a thickness of 300 nm and the second inter-layer insulating layer 42B composed of a nitrogenized silicon film of a thickness of 300 nm are formed covering the selection transistors TR1 (TR2) and the connection electrodes 44A (44B). On the surface of the second inter-layer insulating layer 42B are formed the reflecting electrodes 38 composed of a metallic material such as Al.

With the reflecting electrodes 38, through holes 38a are provided on positions corresponding to the pixel electrodes 35A (35B), and by the inside of the through holes 38a being plugged by the protective layer 43 laminated to cover the surface of the reflecting electrodes 38, insulation of the contact holes H1 is ensured.

The protective layer 43 functions as a planarizing layer that is formed of photosensitive acryl of a thickness of 20 μm that has light permeability. Further, a plurality of pixel electrodes 35A (35B) composed of ITO of a thickness of 50 nm is formed above the protective layer 43. The plurality of pixel electrodes 35A (35B) is connected to the drain electrodes 41d (connection electrodes 44A (44B)) of the selection transistors TR1 (TR2) that correspond via the contact holes H1 (H2) formed penetrating the gate insulating film 41b, the first inter-layer insulating layer 42A, the second inter-layer insulating layer 42B, and the protective layer 43.

In this manner, the element substrate 300 is composed by the components from the first substrate 30 to the pixel electrodes 35A (35B).

Here, although the inter-layer insulating layers 42A and 42B and the protective layer 43 that are formed between the connection electrodes 44A (44B) and the pixel electrodes 35A (35B) are configured by a silicon oxide film, a nitrogenized silicon film, and a photosensitive acryl material, it is also possible to form these using other materials. For example, an inorganic insulating film, an organic insulating film, or the like may be used. Further, the materials of the wires and insulating films are not limited to those described above.

In addition, a configuration in which the pixel electrodes 35A (35B) are not provided is also possible. In this case, a voltage is, applied to the electrophoretic layer 32 directly through the connection electrodes 44A (44B).

Next, the implementation of a display operation by the electrophoretic display device of a two-particle system will be described.

FIGS. 16A to 16D are cross-sectional diagrams illustrating the distribution state of the particles for each display color. Here, FIGS. 16A to 16D are illustrated focusing attention on one pixel, and the number of pixel electrodes 35A and 35B in each pixel is omitted. Further, in order to simplify the drawing, the reflecting electrodes 38 and the pixel electrodes 35A and 35B are illustrated on the same layer. Here, the ground electric potential is input to the opposing electrodes 37 and the reflecting electrodes 38.

Figure 16A:
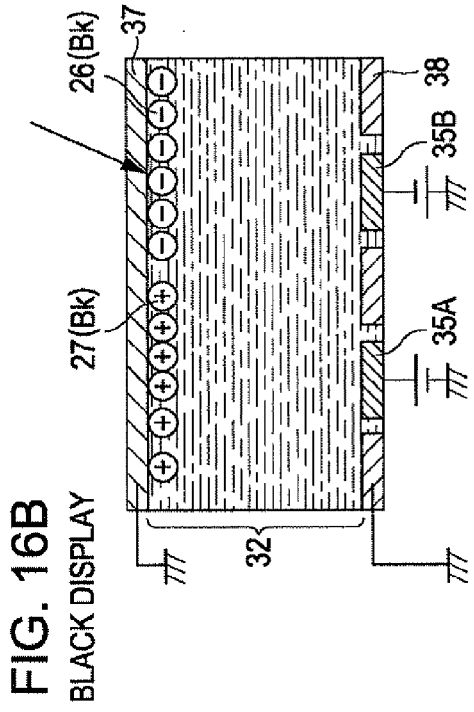
FIG. 16 is a cross-sectional diagram illustrating the distribution state of the particles for each display color.

FIG. 16A illustrates the distribution state of the particles during a white display.

By applying the negative voltage VL (maximum value of negative) to the pixel electrodes 35A and applying the positive voltage VH (maximum value of positive) to the pixel electrodes 35B, the positively charged particles 27 (Bk) are adsorbed above the pixel electrodes 35A and the negatively charged particles 26 (Bk) are adsorbed above the pixel electrodes 35B. Light incident from the outside is reflected by the reflecting electrodes 38 present in the vicinity of the pixel electrodes 35A and 35B, and is emitted from the opposing electrode 37 side.

If the electrophoretic layer 32 is seen from the opposing electrode 37 side in this state, the entirety of the pixels 40 becomes a white display (first presetting state) by reflected light.

Figure 16B:
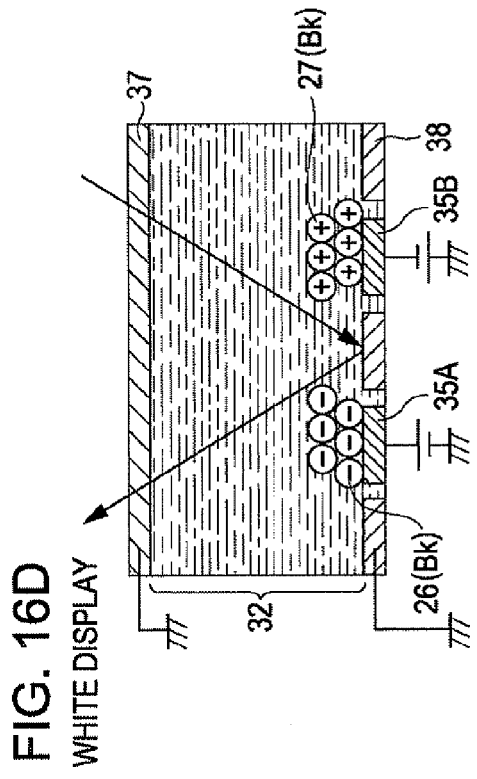

FIG. 16B illustrates the distribution state of the particles during a black display.

In a case when switching from a white display to a black display, by applying the positive voltage VH to each pixel electrode 35A and applying the negative voltage VL to the pixel electrodes 35B, all of the negatively charged particles 26 (Bk) and all of the positively charged particles 27 (Bk) that are adsorbed to each pixel electrode 35A and 35B are moved to the opposing electrode 37 side. The negatively charged particles 26 (Bk) and the positively charged particles 27 (Bk) are two-dimensionally and three-dimensionally distributed over the opposing electrodes 37.

At this time, the film thickness of the protective layer 43 of FIG. 15 is 20 µm, thicker than the 10 µm cell gap of the electrophoretic layer 32. For this reason, the particles above the pixel electrodes 35A and 35B are moved not to the reflecting electrodes 38 but to the opposing substrate.

Because light incident from the outside is absorbed by the negatively charged particles 26 (Bk) and the positively charged particles 27 (Bk) distributed above the opposing electrodes 37, a black display is displayed.

Figure 16C:
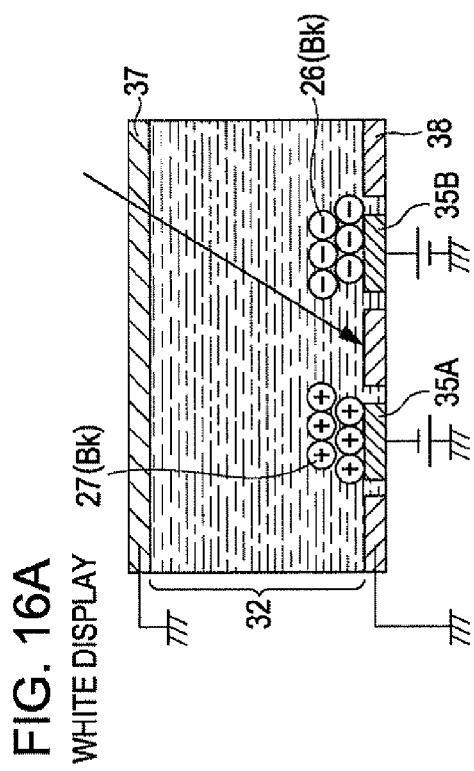

FIG. 16C illustrates the distribution state of the particles during a gray display.

Here, a predetermined voltage is first applied to each pixel electrode 35A and 35B from the state illustrated in FIG. 16A.

In a state where all of the positively charged particles 27 (Bk) are adsorbed above the pixel electrodes 35A and all of the negatively charged particles 26 (Bk) are adsorbed above the pixel electrodes 35B (preset state), if the positive voltage Vh (|Vh|<|VH|) that is lower than the positive voltage VH applied during the black display is applied to the pixel electrodes 35A, and the negative voltage Vl (|Vl|<|VL|) that is lower than the negative voltage VL applied during the black display is applied to the pixel electrodes 35B, a portion of the positively and negatively charged particles 27 (Bk) and 26 (Bk) above the pixel electrodes 35A and 35B is moved to the opposing electrode 37 side. In so doing, a plurality of small black dots is formed in a predetermined region above the opposing electrodes 37 that oppose the pixel electrodes 35A and 35B, and the dispersion medium 21 (T) is present between the black dots. Here, the black display by the positively charges particles 27 (Bk) occupies approximately one third of the area of the entire pixel region. Further, approximately two thirds of the area of the entire pixel region is occupied by a white display by reflected light. White is expressed by light that permeates the dispersion medium 21 (T) between the black dots and that is reflected by the reflecting electrodes 36 returning to the opposing electrode 37 side.

Since the positively charged particles 27 (Bk) and the negatively charged particles 26 (Bk) are two-dimensionally or three-dimensionally distributed above the opposing electrodes 37, and the region of black dots by the positively charged particles 27 (Bk) and the negatively charged particles 26 (Bk) and the region of white dots by the reflected light are mixed, if the electrophoretic layer 32 is seen from the opposing electrode 37 side in this state, gray is displayed overall. That is, the incident light includes a component that is absorbed by the black positively charged particles 27 (Bk) and negatively charged particles 26 (Bk) and a component that is reflected by the reflecting electrodes 36, and if the components are added, gray is displayed overall.

In other words, since a portion of the reflecting electrodes 36 is partially hidden by the positively charged particles 27 (Bk) and negatively charged particles 26 (Bk) present above the opposing electrodes 37 and the light emitting amount of reflected light emitted from the opposing substrate 310 side is reduced, a gray display in which the brightness is subdued is displayed.

Figure 16D:
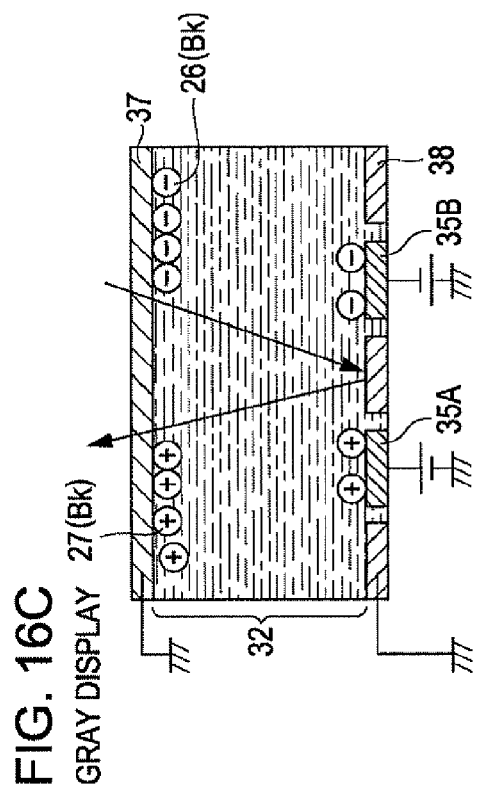

FIG. 16D illustrates the distribution state of the particles during a white display.

Here, a voltage of the opposite polarity to that of the white display illustrated in FIG. 16A is applied above each pixel electrode 35A and 35B. That is, by applying the positive voltage VH to the pixel electrodes 35A and applying the negative voltage VL to the pixel electrodes 35B, all of the negatively charged particles 26 (Bk) are adsorbed above the pixel electrodes 35A and all of the positively charged particles 27 (Bk) are adsorbed above the pixel electrodes 35B. Even in this state, since light incident from the outside is reflected by the reflecting electrodes 38 in the vicinity of the pixel electrodes 35A and 35B, the entirety of the pixels 40 becomes a white display (second presetting state).

Figure 18:
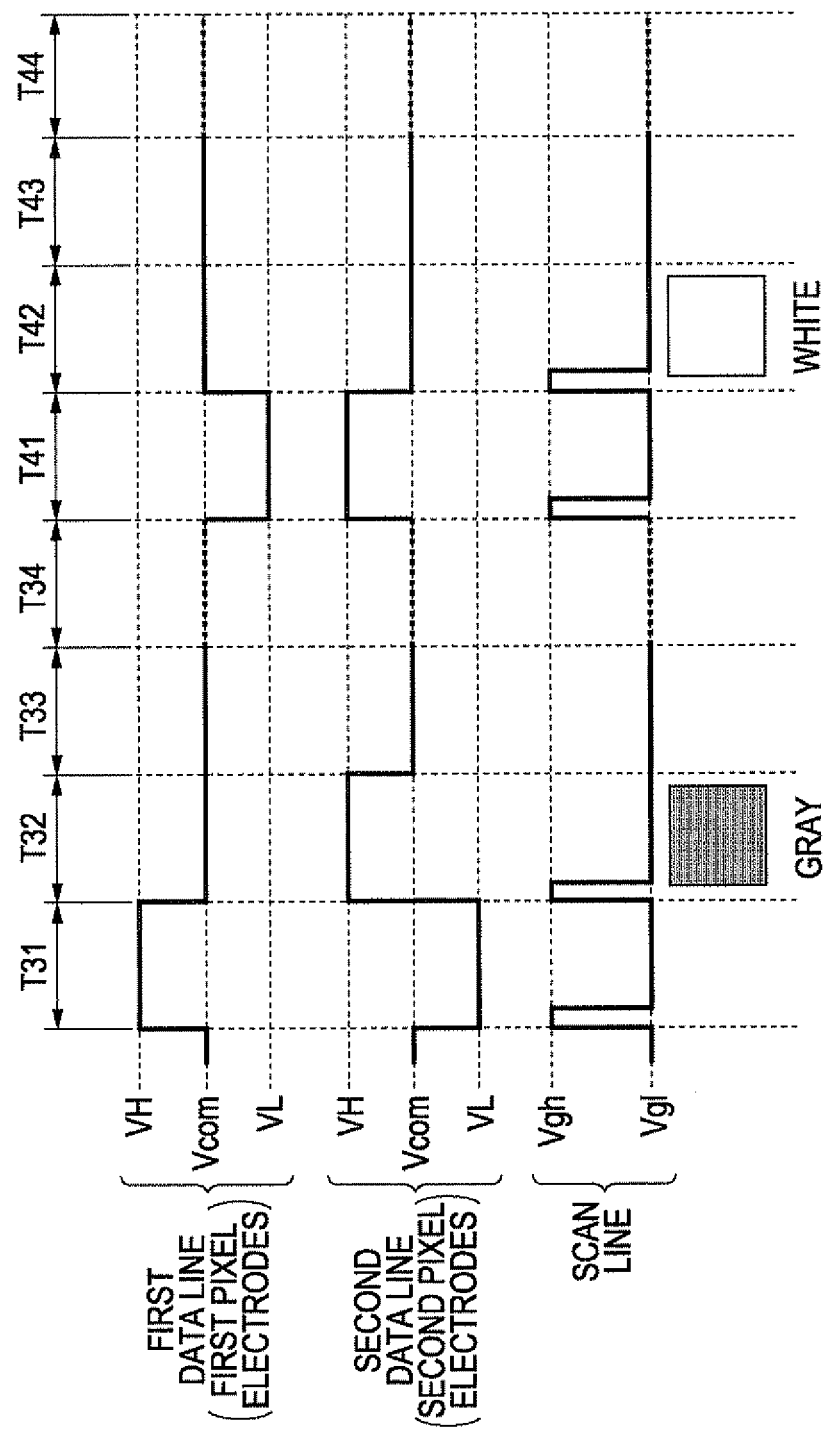
FIG. 18 is a timing chart of when the electrophoretic device of a two-particle system is driven.

FIGS. 17 and 18 are timing charts of when the electrophoretic device of a two-particle system is driven. The ground electric potential (Vcom) is applied to the opposing electrodes 37 and the reflecting electrodes 38, and a predetermined voltage is applied to the pixel electrodes 35A and 35B in this state.

Here, there are several patterns as methods of displaying gray, and these are consecutively implemented.

Gray Display 1

First, a first gray display operation will be described.

As illustrated in FIG. 17, during the presetting period T11, by applying the selection voltage Vgh to m rows of scan lines 66, applying the positive voltage VH to the pixel electrodes 35A via the first data lines 68A, and applying the negative voltage VL to the pixel electrodes 35B via the data lines 68B, all of the negatively charged particles 26 (Bk) and the positively charged particles 27 (Bk) are adsorbed above the pixel electrodes 35A and the pixel electrodes 35B as illustrated in FIG. 16D. In so doing, the pixels 40 are made to display white and return to the initial state.

During the writing period T12, by selecting m rows of scan lines 66, applying the negative voltage Vl (|Vl|<|VL|) to the pixel electrodes 35A, and applying the positive voltage Vh (|Vh|<|VH|) to the pixel electrodes 35B, as illustrated in FIG. 16C, a portion of the charged particles 26 (Bk) and 27 (Bk) that are adsorbed above the pixel electrodes 35A and 35B is moved to the opposing electrode 37 side. In so doing, the pixels 40 become a gray display.

During the display maintenance setting period T13, Vcom is applied to each of the first data lines 68A and the second data lines 68B. During the display maintenance period T14 that follows, the pixel electrodes 35A and 35B, the first data lines 68A and the second data lines 68B, the scan lines 66, and the opposing electrodes 37 are all made to be in a high impedance state. In so doing, the display can be maintained without rewriting. Further, electric power is not consumed in this state.

Gray Display 2

Next, a second gray display operation will be described.

As illustrated in FIG. 17, during the presetting period T21, by selecting m rows of scan lines 66, respectively applying the negative voltage VL to the pixel electrodes 35A while applying the positive voltage VH to the pixel electrodes 35B, all of the charged particles 26 (Bk) and 27 (Bk) are adsorbed above the pixel electrodes 35A and the pixel electrodes 35B to display the pixels 40 in white.

During the writing period T22, m rows of scan lines 66 are selected, and the negative voltage Vl (|Vl|<|VL|) is applied to the pixel electrodes 35B while the positive voltage Vh (|Vh|<|VH|) is applied to the pixel electrodes 35A. In so doing, a portion of the charged particles 26 (Bk) and 27 (Bk) that are adsorbed above the pixel electrodes 35A and 35B is moved to the opposing electrode 37 side and becomes a gray display.

During the display maintenance setting period T23 and the display maintenance period T24, the same operations as T13 and T14 are performed.

Gray Display 3

Next, a third gray display operation will be described.

As illustrated in FIG. 18, during the presetting period T31, by selecting m rows of scan lines 66 and respectively applying the negative voltage VL to the pixel electrodes 35B while applying the positive voltage VH to the pixel electrodes 35A, all of the charged particles 26 (Bk) and 27 (Bk) are adsorbed above the pixel electrodes 35A and the pixel electrodes 35B to display the pixels 40 in white.

During the writing period T32, by selecting m rows of scan lines 66 and applying Vcom to the pixel electrodes 35A while applying the positive voltage VH to the pixel electrodes 35B, all of the positively charged particles 27 (Bk) that are adsorbed above the pixel electrodes 35B are moved to the opposing electrode 37 side while leaving all of the negatively charged particles 26 (Bk) adsorbed above the pixel electrodes 35A. In so doing, the pixels 40 are displayed in gray.

During the display maintenance setting period T33 and the display maintenance period T34, the same operations as T13 and T14 are performed.

White Display

Next, a white display operation will be described.

As illustrated in FIG. 18, during a presetting period T41, by applying the negative voltage VL to the pixel electrodes 35A while applying the positive voltage VH to the pixel electrodes 35B, all of the positively charged particles 27 (Bk) are adsorbed above the pixel electrodes 35A, and all of the negatively charged particles 26 (Bk) are adsorbed above the pixel electrodes 35B. In so doing, white display presetting is implemented.

During the writing period T42, by applying Vcom to each of the pixel electrodes 35A and the pixel electrodes 35B, the adsorption state of each charged particle 26 (Bk) and 27 (Bk) above each pixel electrode 35A and pixel electrode 35B is maintained.

In addition, during a display maintenance setting period T43 and a display maintenance period T44 that follow, the same operations as T13 and T14 are performed.

According to the embodiment, since the two types of the negatively charged particles 26 (Bk) and the positively charged particles 27 (Bk) that are charged as opposite polarities are present in the electrophoretic layer 32, control of the brightness, saturation, and hue of the display image can be performed with greater detail.

As described above, in a case when display operations are consecutively implemented, the polarities of the voltage applied to the pixel electrodes 35A and 35B during the presetting period are reversed during an earlier display operation and a later display operation. Thereby, also in a case when the same image is consecutively displayed, an alternating current is applied between the pixel electrodes 35A and 35B and the opposing electrodes 37.

In addition, also in a case when the same image display is performed, the polarities of the voltage applied to the pixel electrodes 35A and 35B during an earlier display operation and a later display operation may be reversed. Also in this case, an alternating current is applied between the pixel electrodes 35A and 35B and the opposing electrodes 37.

In this manner, it is preferable that the first presetting operation and the second presetting operation be switched for every time that rewriting of a single or a plurality of images is performed. In so doing, the direct current between the pixel electrodes 35A and 35B and the opposing electrodes 37 is completely cancelled, and corrosion of the electrodes and deterioration in the electrophoretic material can be prevented.

Although the ground electric potential has hitherto been continually applied to the reflecting electrodes 38, the embodiment is not limited thereto. As described in the first example, a voltage that aids the movement of particles or that repels the particles may be applied. For example, when changing from FIG. 16A to FIG. 16B in two steps, the following voltages are sequentially applied. When moving the positively charged particles 27 (Bk) to the opposing electrode 37 side in Step 1, a voltage of the same polarity as the pixel electrodes 35A is also applied to the reflecting electrodes 38 and the pixel electrodes 35B. In a case when the negatively charged particles 26 (Bk) are moved in a Step 2 that follows, a negative voltage of the same polarity as the pixel electrodes 35B is also applied to the reflecting electrodes 38 and the pixel electrodes 35A.

Furthermore, the driving voltage, polarity, and the like are changed by a design value of the pixel electrodes 35A and 35B, the reflecting electrodes 38, the opposing electrodes 37, the cell gap, and the like. The numerical values thus far are only examples thereof. As illustrated in FIG. 10, Vcom may be written to the pixel electrodes 35A and 35B by electrically conducting the selection transistors to the display maintenance setting mechanism.

Although preferable embodiments of aspects of the invention have hitherto been described with reference to the attached drawings, needless to say, aspects of the invention are not limited by such examples. It is evident that those skilled in the art are able to contemplate various substitutions and amendments within the category of the technical ideas described within the scope of the claims, and that such substitutions and amendments are necessarily within the technical scope of aspects of the invention.

Although the embodiment described previously was configured to provide reflecting electrodes 36 to which a voltage could be applied, this may be a reflecting layer composed of simply a metallic film, or it may be any configuration that can efficiently reflect light.

Below, several modified examples of the element substrate will be shown.

FIGS. 19A to 19D are cross-sectional diagrams illustrating modified examples of the element substrate.

Figure 19A:
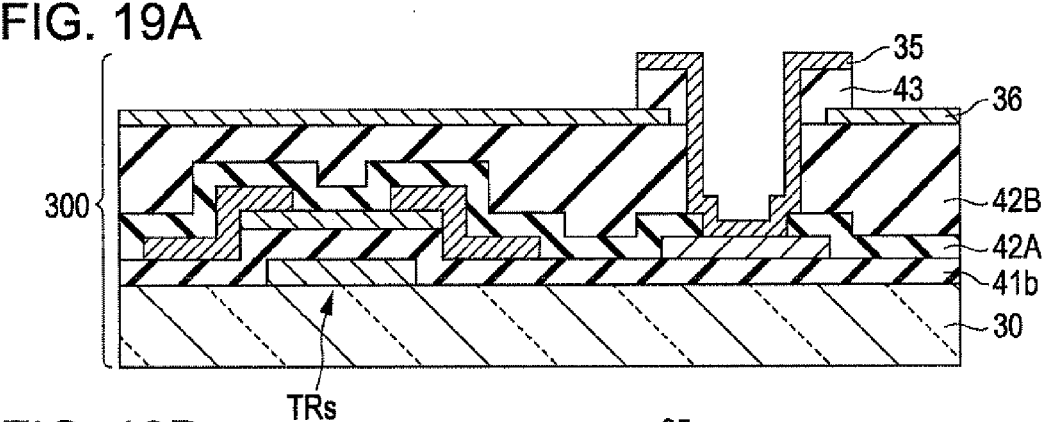
FIGS. 19A to 19D are cross-sectional diagrams illustrating modified examples of the element substrate.

As illustrated in FIG. 19A, the protective layer 43 may be pattern formed at the same time as the pixel electrodes 35 being formed. That is, it may be a configuration in which the reflecting electrodes 36 are exposed to the electrophoretic layer 32 side by removing the regions other than where the pixel electrodes 35 of the protective layer 43 are arranged.

Figure 19B:
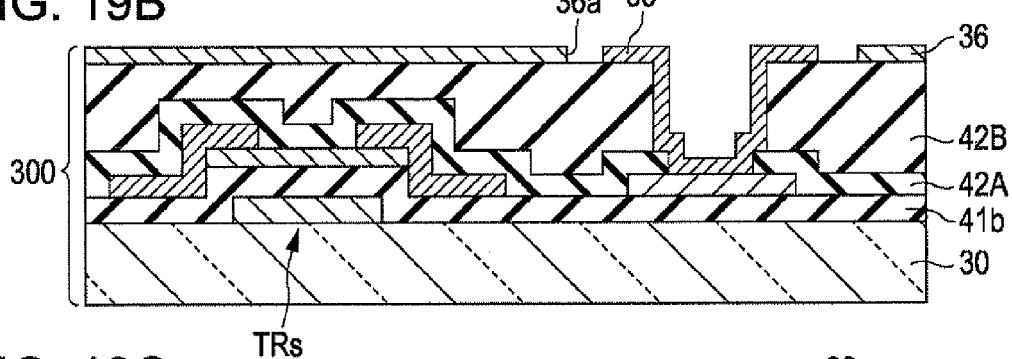

As illustrated in FIG. 19B, the pixel electrodes 35 and the reflecting electrodes 36 may be arranged lined up above the same layer on the surface of the second inter-layer insulating layer 42B. The pixel electrodes 35 are arranged in a separated (insulated) state from the reflecting electrodes 36, inside the through holes 36a formed on the reflecting electrodes 36.

Although the reflecting electrodes 36 are arranged on the same layer or on a lower layer side of the pixel electrodes 35 in each embodiment described above, the reflecting electrodes 36 may be arranged on a higher layer than the pixel electrodes 35.

Figure 19C:
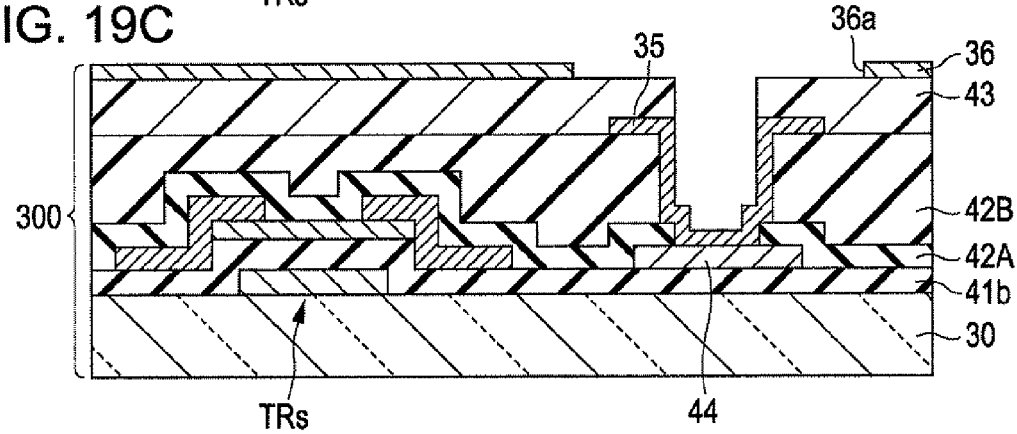

As illustrated in FIG. 19C, the pixel electrodes 35 are on the surface of the second inter-layer insulating layer 42B, and are connected to the connection electrodes 44A (44B) that are exposed from the first inter-layer insulating layer 42A and the second inter-layer insulating layer 42B.

The reflecting electrodes 36 are formed on the surface of the protective layer 43 formed covering the second inter-layer insulating layer 42B, and the through holes 36a that are larger than the diameter of the pixel electrodes 35 are formed on positions corresponding to the pixel electrodes 35.

In so doing, the charged particles 26 (Bk) and 27 (Bk) that are either positively or negatively charged are adsorbed to the surface of the protective layer 43 that is situated above the pixel electrodes 35.

Figure 19D:
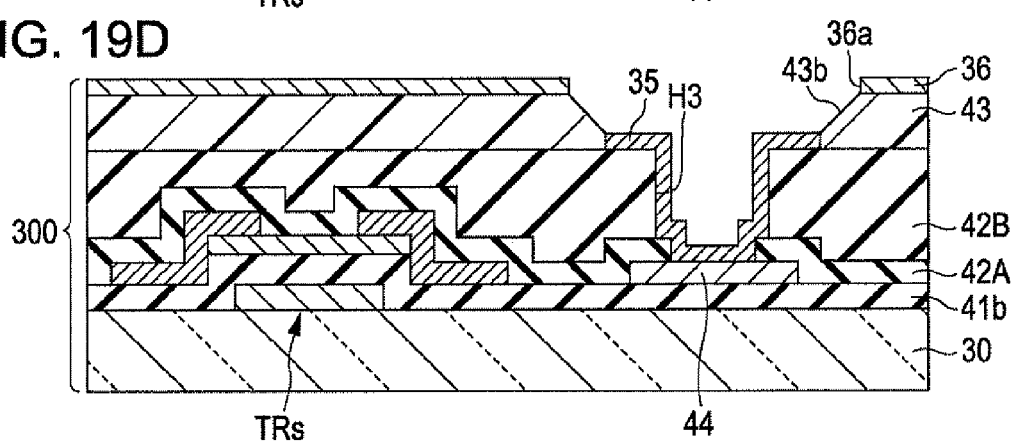

As illustrated in FIG. 19D, the embodiment may be a form in which the protective layer 43 present above the pixel electrodes 35 is removed and the pixel electrodes 35 are exposed to the electrophoretic layer 32 side. At this time, by spreading and inclining the inner periphery of through holes 43b of the protective layer 43 toward the electrophoretic layer 32 side, the movement of the charged particles 26 (Bk) and 27 (Bk) in and out of the through holes 43b becomes smooth.

Figure 20:
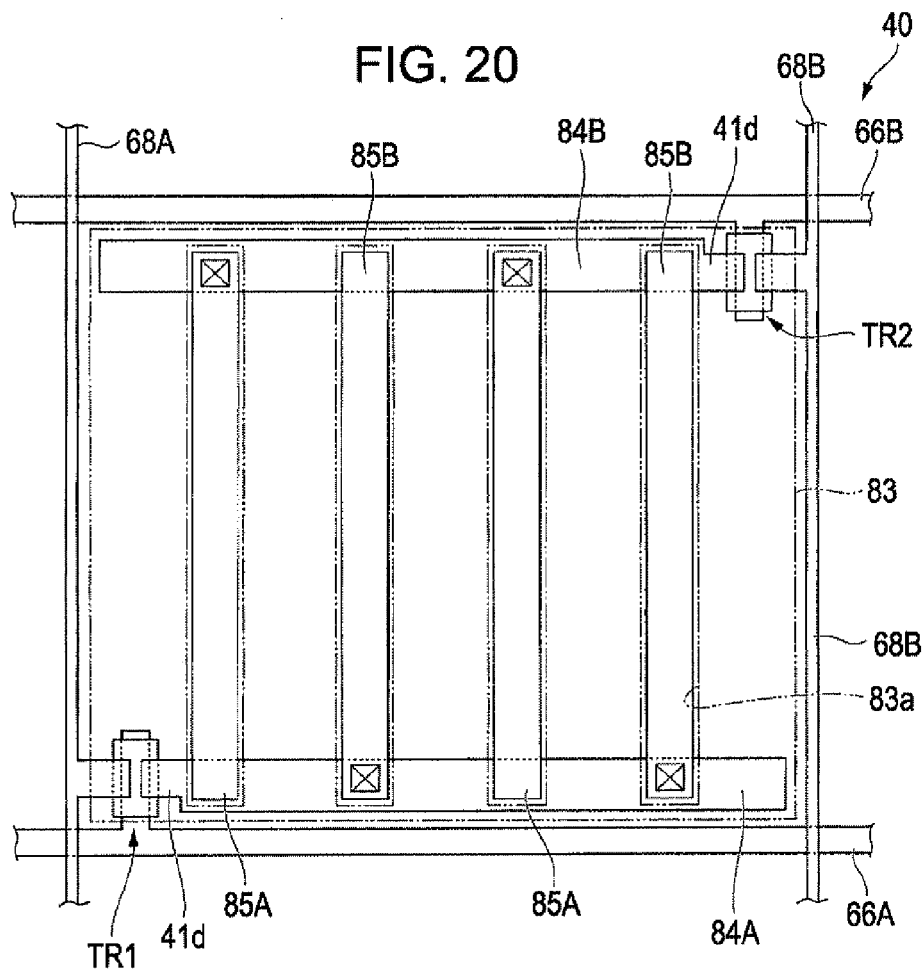
FIG. 20 is a plan diagram illustrating a modified example of a pixel electrode.

FIG. 20 is a plan diagram illustrating a modified example of a pixel electrode.

As illustrated in FIG. 20, a plurality of pixel electrodes 85A and 85B that exhibits a rectangular shape in plan view may be arranged in a striped form inside one pixel (pixel 40). The pixel electrodes 85A and 85B are alternately arranged at even intervals in the short side direction, each of the plurality of pixel electrodes 85A is mutually connected to a connection electrode 84A, and each of the plurality of pixel electrodes 85B is mutually connected to a connection electrode 84B. The connection electrodes 84A and 84B extend perpendicularly to the extending direction of the pixel electrodes 85A and 85B, exhibit a rectangular shape in plan view, and are arranged further to the first substrate 30 side than the pixel electrodes 85A and 85B. Further, the pixel electrodes 85A are connected to the drain electrodes 41d of the transistors TR1 via the connection electrodes 84A, and the pixel electrodes 85B are connected to the drain electrodes 41d of the transistors TR2 via the connection electrodes 843, and are drivable independently of each other.

Openings 83a that are rectangular in plan view and have a greater opening area than the areas in plan view of the pixel electrodes 85A and 85B are arranged on a reflecting layer 83 in plurality according to the number of pixel electrodes 85A and 85B in order to avoid short circuiting between the pixel electrodes 85A and 85B.

Alternatively, the openings 83a may be formed on substantially the entire display portion in a solid form. In such a case, a voltage is applied to the reflecting layer 83 from the outside of the display unit S.

Figure 21:
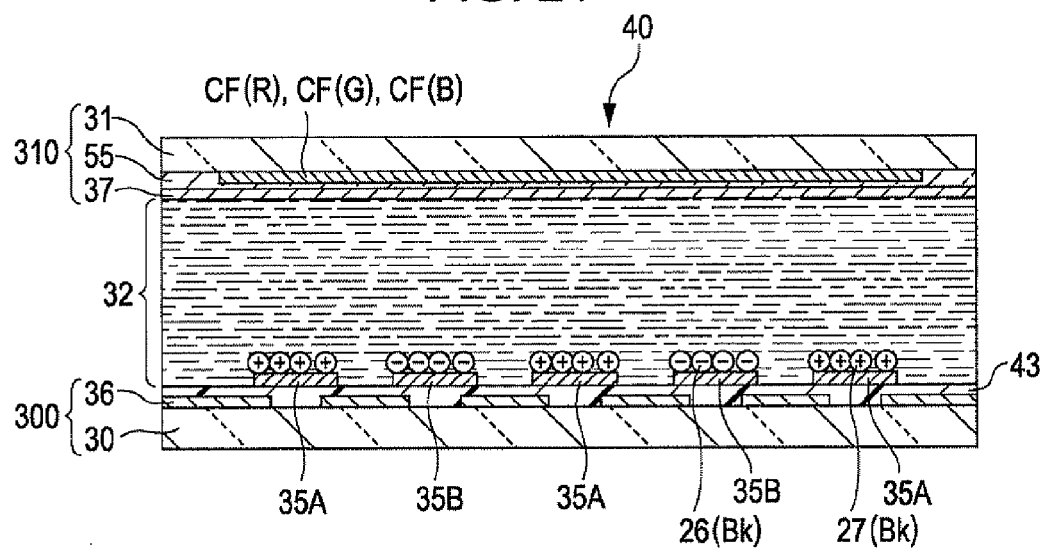
FIG. 21 is a cross-sectional diagram illustrating an outline configuration in a case when a color filter is provided on an opposing substrate side.

FIG. 21 is a cross-sectional diagram illustrating an outline configuration in a case when a color filter is provided on the opposing substrate side.

As illustrated in FIG. 21, a color filter CF including filters of three colors (R, G, B) may be provided to the opposing substrate 310 of the first and second embodiments described earlier for each pixel 40.

The color filter CF is covered by a transparent protective film 55 composed of photosensitive acryl. The protective film 55 is formed with high adhesion to the color filter CF, and includes the functions of protecting the color filter CF and planarizing above the second substrate 31.

The opposing electrodes 37 are formed in a solid form on a surface of the protective film 55.

By such a configuration, light incident from the second substrate 31 side is colored by being incident on the color filter CF and is reflected to the second substrate 31 (observer) side by the reflecting electrodes 36 provided on the element substrate 300. As a result, the utilization efficiency of the light is improved, and a color display that is bright and in which the visual characteristics are favorable is performed.

Here, the color filter CF may be a pigment type or a dye type.

In the case of a configuration as described above, since the reflecting electrodes 36 and the reflecting electrodes 38 are composed of metallic layers that are formed substantially flat, there is a problem that glaring occurs if regularly reflected light is incident and visual characteristics deteriorate. A configuration example that mitigates this will be described below.

Figure 22:
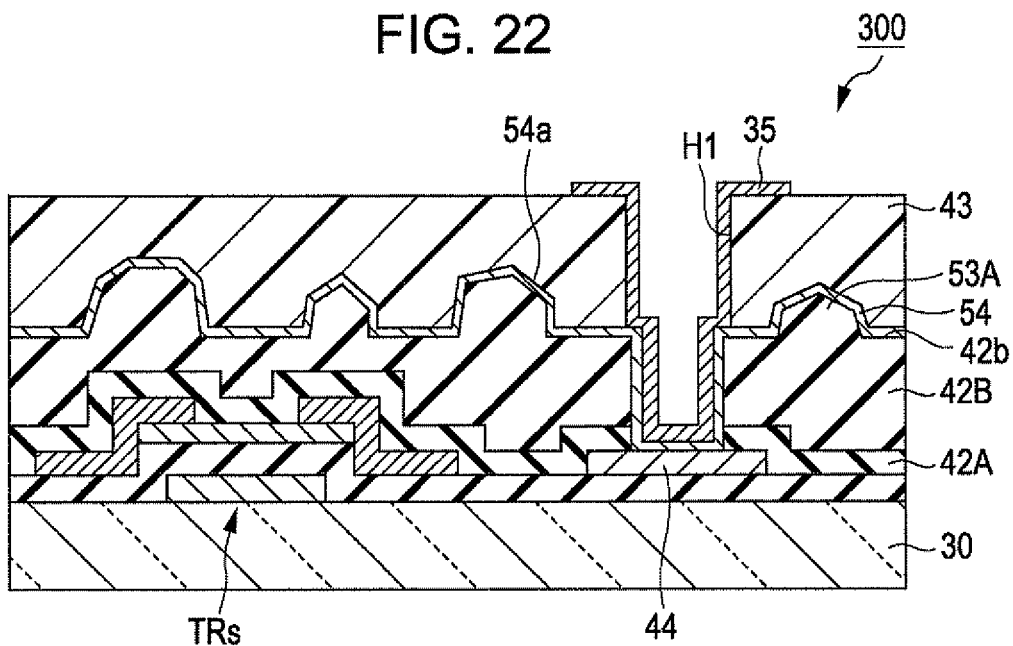
FIG. 22 is a cross-sectional diagram illustrating an outline configuration of an element substrate that includes reflecting electrodes to which a light scattering property is conferred.
Figure 23:
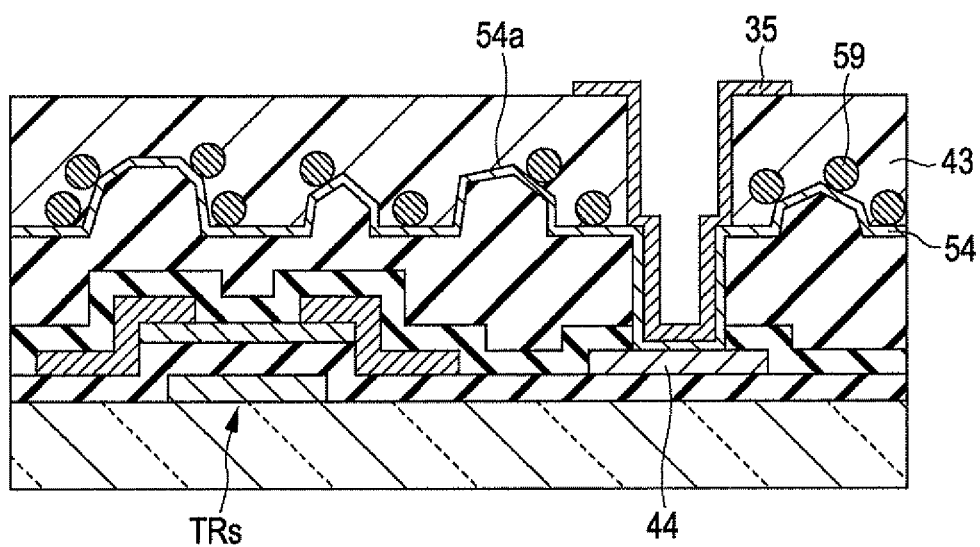
FIG. 23 is a cross-sectional diagram illustrating an outline configuration of an element substrate that includes reflecting electrodes and scattering particles to which a light scattering property is conferred.

FIG. 22 is a cross-sectional diagram illustrating an outline configuration of an element substrate that includes reflecting electrodes to which a light scattering property is conferred. FIG. 23 is a cross-sectional diagram illustrating an outline configuration of an element substrate that includes reflecting electrodes and scattering particles to which a light scattering property is conferred.

The element substrate 300 illustrated in FIG. 22 has the selection transistors TRs and the connection electrodes 44 formed for each pixel above the first substrate 30, and has the first inter-layer insulating layer 42A and the second inter-layer insulating layer 42B covering the selection transistors TRs and connection electrodes 44 formed in this order over the entire substrate surface.

A surface 42b of the second inter-layer insulating layer 423 is a concavo-convex shape, and has a plurality of convex portions 53A that protrude to the opposite side of the first substrate 30. The shape in plan view, the cross-sectional shape, the height, and the like of the convex portions 53A are uneven in at least one pixel 40, and the arranging positions of the plurality of convex portions 53A above the first substrate 30 are random positions.

The second inter-layer insulating layer 42B illustrated in FIG. 22 is composed of photosensitive acryl, and concavoconvexes are formed on the surface 42b by using the strength and weakness of the light during an exposure process.

The reflecting electrodes 54 (reflecting layer) are provided above the second inter-layer insulating layer 42B following the shape of the surface 42b. Since the film thickness of the reflecting electrodes 54 is thin compared to the film thickness of the second inter-layer insulating layer 42B, the reflecting electrodes are a shape reflecting the surface 42b of the second inter-layer insulating layer 42B, that is, the outer form of the convex portions 53A. In this manner, the surface (scattering surface) 54a of the reflecting electrodes 54 becomes a scattering surface, and reflecting electrodes (scattering members) 54 having light reflectivity and light scattering characteristics are obtained.

The reflecting electrodes 54 are connected to the pixel electrodes 35 inside the contact holes H1.

With such a configuration, by forming the reflecting electrodes 36 composed of a thin metallic film above the second inter-layer insulating layer 42B in which the surface 42b is a concavo-convex shape, the concavo-convex shape of the surface 42b of the second inter-layer insulating layer 42B can be reflected on the reflecting electrodes 36. In this manner, by utilizing the shape of the second inter-layer insulating layer 42B and adopting a technique in which a concavo-convex shape is conferred to the reflecting electrodes 36, it is possible to more easily produce the reflecting electrodes 54 having light scattering characteristics than by making the surface of a metallic film a concavo-convex shape using an etching method or the like. Further, since the thickness of the metallic film can also be reduced, the device can be lightened and the cost of the materials can be reduced.

In addition, although, in principle, the display often becomes dark in cases when the color filter CF is provided on the opposing substrate 310 side, by providing the reflecting electrodes 54 having light scattering characteristics on the element substrate 300 side, since glaring due to regular reflection is suppressed and the light can be used for displaying in other viewing angle directions, a color display that is bright and in which the visual characteristics are favorable becomes possible.

In addition, as illustrated in FIG. 23, dispersion particles (dispersion members) 59 that disperse light may be scattered and arranged above the surface 54a of the reflecting electrodes 54. Specifically, an abundance of the dispersion particles 59 is mixed into the protective layer 43. The dispersion particles 59 are composed of, for example, titania particles. Here, as the dispersion particles 59, colorless and transparent particles, translucent particles of the same color as the color filter, reflective materials such as metals, or the like can be used.

In so doing, by the light incident on the electrophoretic display device being emitted to the observer side after being reflected (irregularly reflected) once or a plurality of times by the dispersion particles 59, the brightness of the display image is heightened and the visual characteristics are improved. By providing the reflecting electrodes 54 having light scattering characteristics and the dispersion particles 59, the utilization efficiency of the light is improved, and an electrophoretic display device that is brighter and in which the visual characteristics are excellent is obtained.

Figure 24A:
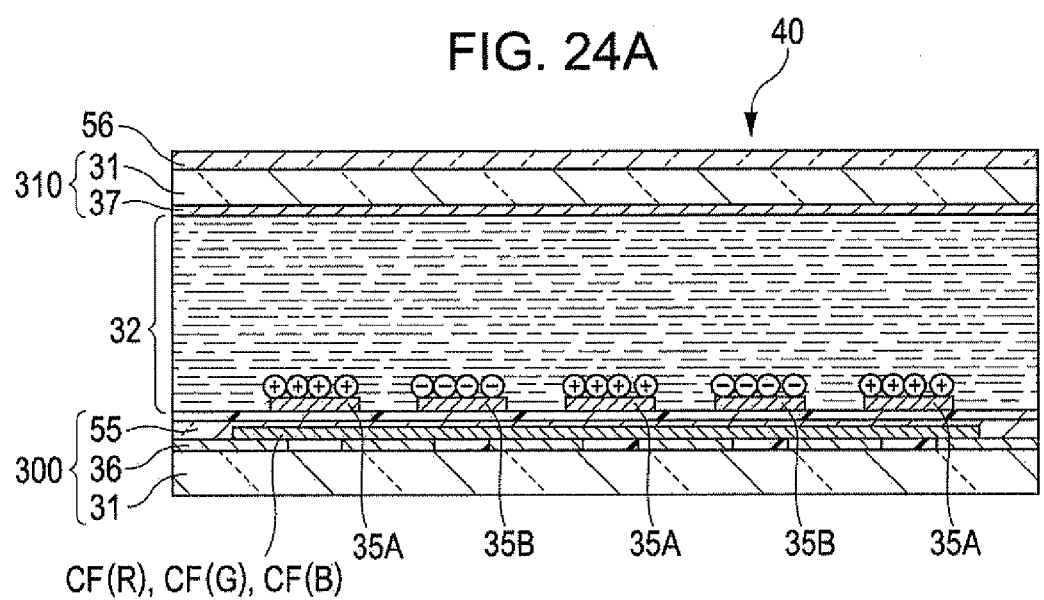
FIG. 24A is a cross-sectional diagram illustrating an outline configuration of one pixel of an electrophoretic display device having a light diffusion plate.
Figure 24B:
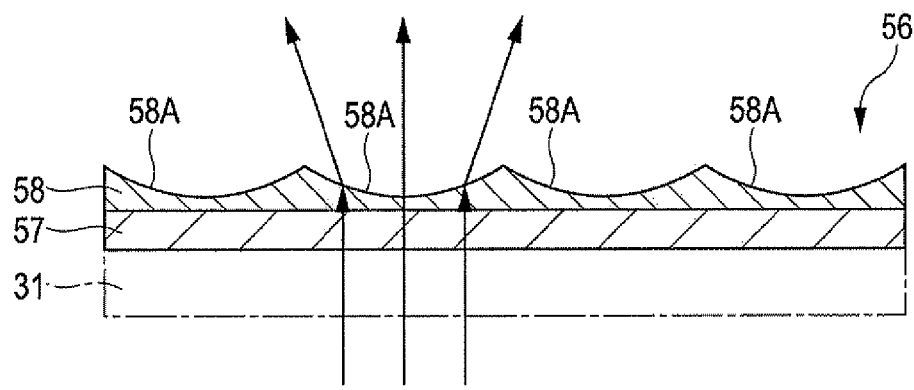
FIG. 24B is a cross-sectional diagram illustrating an outline configuration of the light diffusion plate.
Figure 24C:
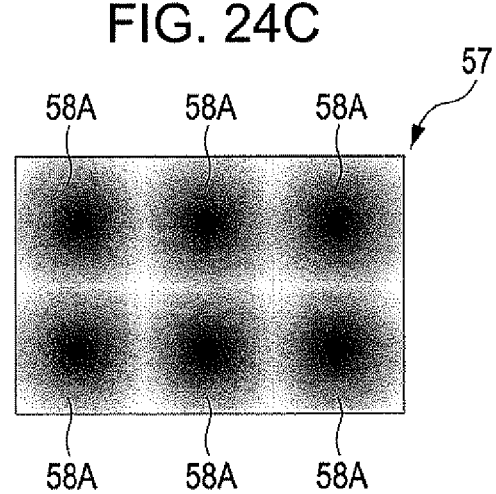
FIG. 24C is a plan diagram illustrating an outline configuration of the light diffusion plate.

FIG. 24A is a cross-sectional diagram illustrating an outline configuration of one pixel of an electrophoretic display device having a light diffusion plate, FIG. 24B is a cross-sectional diagram illustrating an outline configuration of the light diffusion plate, and FIG. 24C is a plan diagram illustrating an outline configuration of the light diffusion plate.

The electrophoretic display device illustrated in FIG. 24A includes a light diffusion plate (diffusion material) 56 that has light diffusibility on an outer surface side of the opposing substrate 310 (second substrate 31). The light diffusion plate 56 is configured to include, as illustrated in FIG. 24B, a diffusion panel 57 and a diffusion layer 58. In the diffusion layer 58 is formed a plurality of concave portions 58A that are caved in toward the diffusion panel 57 side and, as illustrated in FIG. 24C, exhibit a square shape in plan view.

The diffusion panel 57 includes a supporting substrate, and the diffusion layer 58 includes a light diffusion function.

In addition, as illustrated in FIG. 24A, the color filter CF is provided on the element substrate 300 for each pixel 40. The color filters CF are formed above the reflecting electrodes 36. Light incident from the opposing substrate 310 side permeates the electrophoretic layer 32 and the color filters CF, and is reflected to the opposing substrate 310 side by the reflecting electrodes 36 on a lower layer of the color filters CF. The reflected light that reaches the light diffusion plate 56 is scattered at predetermined angles.

By arranging such a light diffusion plate 56 between the opposing substrate 310 and the observer, out of the reflected light reflected by the reflecting electrodes 36, regularly reflected light also becomes possible to be used for displaying as scattered light by the light diffusion plate 56. In so doing, not only is glaring of the display able to be prevented, but the display brightness can also be improved.

Here, the light diffusion plate 56 may be a configuration that causes so-called irregular reflections.

Figure 25A:
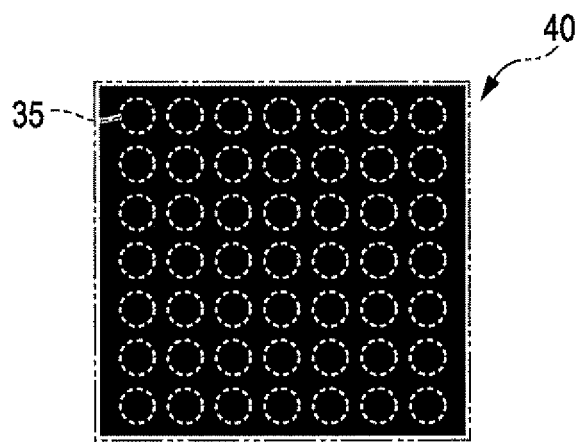
FIGS. 25A and 25B are diagrams illustrating the display state of one pixel that differs depending on the number of pixel electrodes, that is.
Figure 25B:
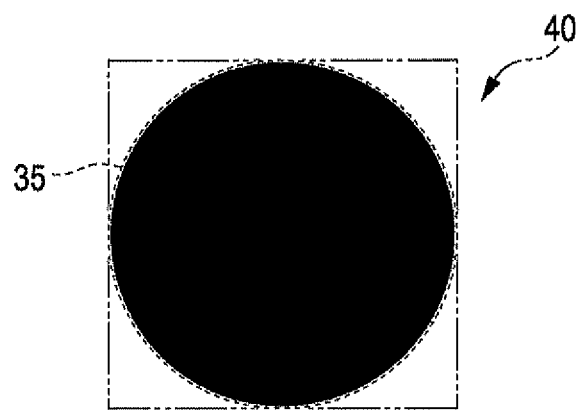

In addition, in the previous embodiment, a plurality of pixel electrodes 35 is arranged in one pixel 40 across the entire pixel region. FIGS. 25A and 25B are diagrams illustrating the display state of one pixel that differs depending on the number of pixel electrodes 35, that is, FIG. 25A is a diagram illustrating a case when there is a plurality of pixel electrodes 35 in one pixel, and FIG. 25B is a diagram illustrating a case when only one pixel electrode is arranged in one pixel.

As illustrated in FIG. 25A, by providing a plurality of pixel electrodes 35 in one pixel 40, it is possible to evenly display a black display or a gray display over the entirety of the pixel 40.

As illustrated in FIG. 25B, in a case when only one pixel electrode 35 is arranged in one pixel 40, for example, with a configuration in which one pixel electrode 35 is arranged in the centre of the pixel 40, display is not possible in the four corners of the pixel 40 and a sufficient contrast is not obtained.

For this reason, a configuration in which a plurality of pixel electrodes 35 is arranged in the pixel 40 and a desired display is performed over every corner of the pixel 40 is adopted.

In addition, the electrophoretic materials that can be used in each of the embodiments described above are not limited to those described above. A capsule-type or barrier-type electrophoretic material may be used.

However, in a case when an electrophoretic layer that is demarcated per predetermined region, such as the capsule type or the barrier type, is used, the distribution of charged particles cannot be spread in regions where such demarcations are present. For this reason, there are regions where display cannot be performed, which becomes a cause of a decrease in display performance by lowering the contrast, lowering the brightness, and the like.

On the other hand, the electrophoretic layer 32 of each embodiment described above has no demarcations per predetermined region, and the charged particles are distributed spreading above the opposing electrodes 37. For this reason, the borders between neighboring pixels can also be easily covered by the charged particles, and a configuration in which the contrast and visual characteristics can be improved is possible.

In addition, the dispersion medium 21 may use thin film layers between the electrodes 35 and 37, the protective layer 43, and the like in order to avoid direct contact therebetween. This can also be used for the charged particles to reliably perform adsorption and withdrawal by an electric field. The material used for the thin film layer may be an organic film or an inorganic film.

In addition, the color of the charged particles is not limited to black and white. For example, by using red charged particles without using a color filter, it is possible to perform a white display or a red display.

Further, the particles may be an electronic liquid powder, or may use other organic or inorganic materials.

Furthermore, the dispersion medium 21 may be, other than a liquid, a gas or a vacuum.

As the material of the dispersion medium 21, a substantially colorless and transparent material is preferable. As such a dispersion medium, a material having relatively strong insulating properties is preferably used. As such a dispersion medium, for example, various types of water (distilled water, pure water, deionized water, and the like), alcohols such as methanol, ethanol, and butanol, cellusolves such as methyl cellusolve, esters such as methyl acetate and ethyl acetate, ketones such as acetone and methyl ethyl ketone, aliphatic hydrocarbons such as pentane, alicyclic hydrocarbons such as cyclohexane, aromatic hydrocarbons such as benzenes derivatives that include long-chain alkyl groups such as benzene and toluene, halogenated hydrocarbons such as methylene chloride and chloroform, heterocyclic aromatics such as pyridine and pyrazine, nitriles such as acetonitrile and propionitrile, amides such as N,N-dimethylformamide, mineral oils such as carboxylates and liquid paraffin, vegetable oils such as linoleic acid, linolenic acid, and oleic acid, silicone oils such as dimethyl silicone oil, methylphenyl silicone oil, and methyl hydrogen silicone oil, fluorine-based liquids such as hyrdrofluoroether, and various other oils can be used alone or in combination. Further, in the dispersion medium, for example, various additives such as charge control agents composed of particles of electrolytes, surfactants, metallic soaps, resin materials, rubber materials, oils, varnish, and compounds, and dispersants, lubricants, and stabilizers of coupling agents such as titanium-based coupling agents, aluminum-based coupling agents, silane coupling agents may be added according to needs.

Although the charged particles included in the dispersion medium 21 may use any form and thus are not particularly limited, at least one of dye particles, pigment particles, resin particles, ceramic particles, metallic particles, electronic liquid powders, oxidized metallic particles, or composite particles thereof are preferably used. Such particles have the advantages of being easily producible and control of the electric charge can be performed relatively easily.

As the pigments to configure the pigment particles, black pigments such as aniline black, carbon black, and titanium black, white pigments such as titanium dioxide, antimony trioxide, zinc sulfide, and zinc oxide, azo pigments such as monoazo, disazo, and polyazo, yellow pigments such as isoindolinone, chrome yellow, yellow iron oxide, cadmium yellow, and titan yellow, red pigments such as quinacridone red and chrome vermilion, blue pigments such as phthalocyanine blue, indanthrene blue, Prussian blue, ultramarine, and cobalt blue, green pigments such as phthalocyanine green, cyan pigments such as ferric ferrocyanide, and magenta pigments such as inorganic iron oxides can be given as examples. Inorganic pigments and organic pigments may be used. One kind or two or more kinds of the above may be used in combination. Dye particles may be configured using dyes instead of the above pigments. In this case, dyes may be mixed into white pigments, or the dyes may be used mixed with the pigments for coloring. For example, a dye such as a carbonium magenta may be used.

In addition, as the resin materials to configure the resin particles, AS resin such as acrylic resin, urethane resin, urea resin, epoxy resin, rosin resin, styrene-acrylonitrile resin made by copolymerizing polystyrene, polyester, styrene, and acrylonitrile, and the like are given as examples. Of these, one kind or two or more kinds may be used in combination.

Further, as composite particles, one where the surface of the pigment particles is coated by resin materials, one where the surface of the resin particles is coated by pigment materials, particles configured by a mixture where pigments and resin materials are mixed at an appropriate composition ratio, and the like are given as examples.

In addition, in order to improve the dispersibility of such electrophoretic particles in the dispersion medium 21, a high polymer with high compatibility with the dispersion medium 21 may be physically adsorbed to or chemically combined with the surface of each particle. Out of these, due to the problem of desorption from the surface of the electrophoretic particles, one where a high polymer is chemically combined is particularly preferable. With such a configuration, by operating in a direction in which the relative weight of the appearance of the electrophoretic particles becomes small, the affinity of the electrophoretic particles to the dispersion medium, that is, the dispersibility, can be improved.

As such a high polymer, a high polymer including a group having reactivity with the electrophoretic particles and a charged functional group, a high polymer including a group having reactivity with the electrophoretic particles and a long alkyl chain, a long ethylene oxide chain, a long alkyl fluoride chain, a long dimethyl silicone chain, or the like, and a high polymer including a group having reactivity with the electrophoretic particles, a charge functional group, and a long alkyl chain, a long ethylene oxide chain, a long alkyl fluoride chain, a long dimethyl silicone chain, or the like, and the like are given as examples.

With the high polymers described above, as the group having reactivity with the electrophoretic particles, an epoxy group, a thioepoxy group, an alkoxysilane group, a silanol group, an alkylamide group, an aziridine group, an oxazone group, an isocyanate group, and the like are given as examples. Of these, while one kind or two or more kinds may be selected and used, they may be selected in accordance with the kind of electrophoretic particles used and the like.

Although the average particle diameter of the electrophoretic particles is not particularly limited, 0.01 to 10 μm is preferable, and 0.02 to 5 μm is more preferable.

In addition, acryl is used as the material of the insulating film for ensuring the insulation between the pixel electrodes 35 and the connection electrodes. A material other than this can also be used, and an inorganic insulating film or an organic insulating film such as a silicon oxide film is possible.

As the first substrate 30 and the second substrate 31, an organic insulating substrate other than a PET substrate, an inorganic glass substrate such as a thin glass, or a composite substrate composed of inorganic materials or organic materials may be used.

In addition, the selection transistors are not limited to those using an oxide semiconductor. A silicon type or an organic TFT may be used.

The material used for the light diffusion plate 56 is not limited to acryl and PET. Any transparent material may be used.

Further, the curved face (configuration) of the concave portions 58A that causes diffusion on the diffusion layer 58 is not limited to that illustrated in the drawing. The range of the emitted light, that is, the viewing angles, may be determined by the design of the curved face of the concave portions 58A, and the designed value may be changed according to the purpose.

Here, a variety of shapes other than the curved face may be used to realize the necessary viewing angles. For example, using steps in a staircase pattern is also possible.

In addition, the two-dimensional arrangement of the plurality of concave portions 58A in the diffusion layer 58 is not limited to that described above. For example, by making the shape of the concave portions 58A in plan view not a square but a rectangle, the viewing angle can be controlled in the up and down and left and right directions. Further, the shape may be an ellipse or a circle and not a square, and the gaps may be filled with concave portions that are small circles, ellipses, and polygons. Further, the curved faces of the concave portions may be a configuration having multiple steps. The shape is not limited as long as the function of diffusing and emitting light in directions over a certain range is retained. Further, the concave portions may be configured to selectively diffuse incident light from particular directions. In addition, the concave portions may be configured to diffuse incident light from particular directions and to further emit light. Further, in FIG. 24B, the diffusion layer 58 and the diffusion panel 57 may be configured above the second substrate 31 in that order. The diffusion layer 58 and the diffusion panel 57 may use a configuration other than that described above such as integral formation.

As the light diffusion plate 56, a film including the function of diffusing light incident from directions of a certain range may be used. The film does not have a diffusion function against light other than those from the above-described directions, and is transparent. For example, if the certain range described above is the direction of incident light that causes regular reflection, light that in the past was regular reflection and could not be used for display can be used for display. Further, since there is no diffusion function for other directions, there is no bleeding of a displayed image such as characters. The diffusion angle of the film is set to correspond to the position of fluorescent light if indoors, and the sun if outdoors when the electrophoretic display device is used. The angles to which the film diffuses can be freely set. For example, by laminating films having different angles of diffusion, the angles can be the sum thereof, or the angles of diffusion may be changed when producing the films. Further, it is also possible to make the diffusion more reliable by laminating films with the same angles of diffusion. Design according to usage can be performed.

A moisture-proof layer such as a silicon oxide film may be provided on the light diffusion plate 56. Electro-optical characteristics change with humidity with electrophoretic materials and other electro-optical devices. The prevention thereof can also be performed at the same time. The moisture-proof layer may be provided on the surface of one side or both sides of the diffusion material or in the material of the base material or the like. Further, by mixing the moisture-proof material not in the layer but in the diffusion material, the moisture-proofing characteristics may be improved.

In addition, the film thickness, material, and the like of each electrode 35, 37, and each layer are not particularly limited.

Further, the shape of the pixel electrodes 35 in plan view is not necessarily circular, and may be polygonal, elliptical, or the like.

Further, although the colored particles have hitherto been moved by the opposing electrodes in the examples, a configuration in which the opposing electrodes are not used is possible. In this case, the reflecting electrodes are used instead of the opposing electrodes. That is, the particles are controlled by the voltage applied between the pixel electrodes and the reflecting electrodes, and a display is performed using the difference in the areas of the colored particle distribution between the electrodes.

Electronic Apparatus

Next, a case when the electrophoretic display device of each embodiment described above is applied to an electronic apparatus will be described.

Figure 26A:
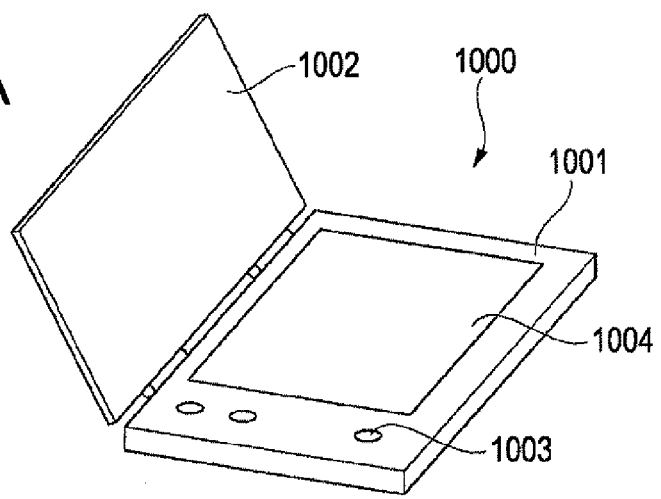
FIGS. 26A to 26C are perspective diagrams describing a specific example of an electronic apparatus applying the electrophoretic display device of an aspect of the invention.
Figure 26B:
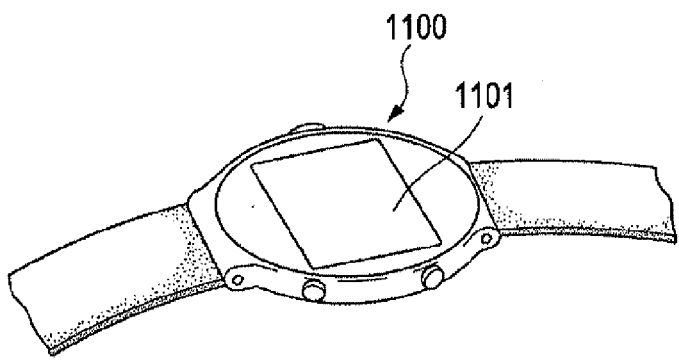
Figure 26C:
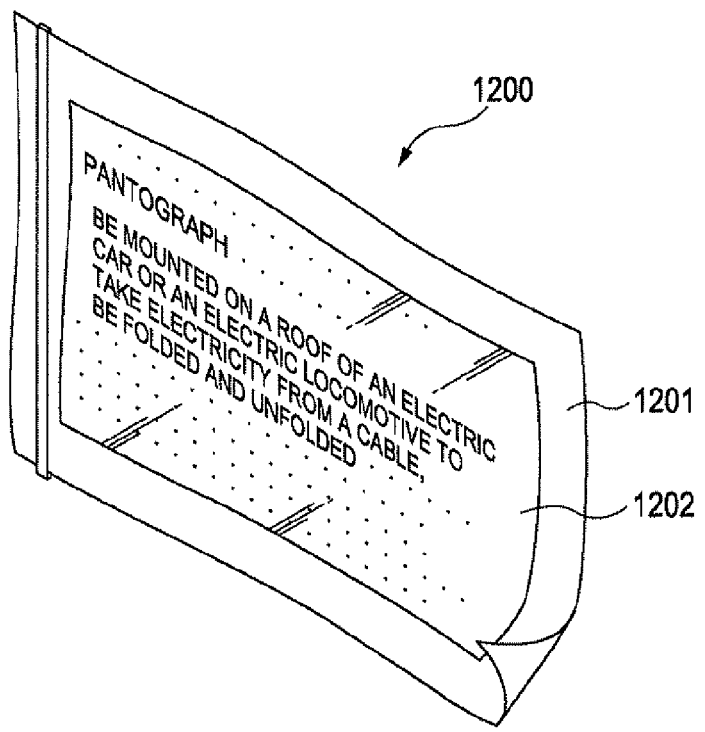

FIGS. 26A to 26C are perspective diagrams describing a specific example of an electronic apparatus applying the electrophoretic display device of an aspect of the invention.

FIG. 26A is a perspective diagram illustrating an electronic book that is one example of the electronic apparatus. The electronic book (electronic apparatus) 1000 includes a book-shaped frame 1001, a cover 1002 that is provided to be freely rotatable (to open and close) against the frame 1001, an operation unit 1003, and a display unit 1004 configured by the electrophoretic display device of some aspects of the invention.

FIG. 26B is a perspective diagram illustrating a watch that is another example of the electronic apparatus. The watch (electronic apparatus) 1100 includes a display unit 1101 configured by the electrophoretic display device of some aspects of the invention.

FIG. 26C is a perspective diagram illustrating electronic paper that is yet another example of the electronic apparatus. The electronic paper (electronic apparatus) 1200 includes a main body unit 1201 configured by a rewritable sheet having the same texture and pliability as paper, and a display unit 1202 configured by the electrophoretic display device of some aspects of the invention.

For example, since it is supposed that there is a usage for the electronic book and the electronic paper in which characters are repeatedly written on a white background, there is need to resolve residual images when deleting and residual images over time.

Here, the range of the electronic apparatuses applicable to the electrophoretic display device of aspects of the invention is not limited thereto, and widely includes devices utilizing the change in visible color tone that accompanies the movement of colored particles.

Since the electronic book 1000, the watch 1100, and the electronic paper 1200 adopt the electrophoretic display device of some aspects of the invention, these are electronic apparatuses provided with color display means.

Here, the electronic apparatuses described above are examples of electronic apparatuses related to the invention, and do not limit the technical scope of the invention. For example, the electrophoretic display device according to aspects of the invention can be preferably used for the display units of electronic apparatuses such as mobile phones and portable audio apparatuses.

The entire disclosure of Japanese Patent Application No. 2010-208418, filed Sep. 16, 2010 is expressly incorporated by reference herein.

What is claimed is:
1. An electrophoretic display device comprising:
a first substrate and a second substrate;

an electrophoretic layer that is arranged between the first substrate and the second substrate and that includes at least a dispersion medium and positively or negatively charged colored particles mixed into the dispersion medium;

first electrodes that are formed for each pixel on the electrophoretic layer side of the first substrate and that are independently driven for each pixel;

first transistors connected to the first electrodes;

opposing electrodes that are formed on the electrophoretic layer side of the second substrate, have larger areas than the first electrodes, and have transparency; and a reflecting layer that is formed over the first substrate, reflects light, and that has a larger area than the first electrodes, wherein the gradation is controlled by an area of the colored particles that is visible when the electrophoretic layer is seen from the second substrate side.

2. The electrophoretic display device according to claim 1, wherein input of an electric potential to the reflecting layer is possible.

3. The electrophoretic display device according to claim 1, wherein the reflecting layer is arranged via a first insulating layer having light permeability further to the first substrate side than the first electrodes.

4. The electrophoretic display device according to claim 1, wherein the reflecting layer is formed for each pixel and is connected to the first electrodes.

5. The electrophoretic display device according to claim 1, wherein a voltage that repels the colored particles is applied to the reflecting layer.

6. The electrophoretic display device according to claim 1, wherein the reflecting layer is connected to a power source.

7. The electrophoretic display device according to claim 3, wherein at least one portion of the reflecting layer is exposed from the first insulating layer to the electrophoretic layer side.

8. The electrophoretic display device according to claim 1, further comprising:

first colored particles that are positively charged;

second colored particles that are the same color as the first colored particles, and that are negatively charged;

second electrodes in the electrophoretic layer side of the first substrate; and second transistors connected to the second electrodes.

9. The electrophoretic display device according to claim 1, further comprising a plurality of the first electrodes for each pixel, wherein each of the plurality of first electrodes is connected to each other by a first connection electrode formed on a layer further to the first substrate side than the first electrodes.

10. The electrophoretic display device according to claim 9, further comprising a plurality of the first electrodes and a plurality of the second electrodes for each pixel, wherein each of the plurality of first electrodes is connected to each other by the first connection electrode formed on a layer further to the first substrate side than the first electrodes, and each of the plurality of second electrodes is connected to each other by a second connection electrode formed on a layer further to the first substrate side than the second electrodes.

11. The electrophoretic display device according to claim 1, wherein the surface of the reflecting layer is a scattering surface that scatters the light.

12. The electrophoretic display device according to claim 11, further comprising a second insulating layer on which a plurality of convex portions protruding toward the reflecting layer is formed further to the first substrate side than the reflecting layer, wherein the scattering surface of the reflecting layer reflects the shape of the plurality of convex portions.

13. The electrophoretic display device according to claim 1, wherein scattering members that scatter the light are included between the reflecting layer and the second substrate side.

14. The electrophoretic display device according to claim 1, wherein a color filter is provided further to the second substrate side than the reflecting layer.

15. The electrophoretic display device according to claim 1, wherein a diffusion material is provided on an outer surface that is the opposite side to the electrophoretic layer side of the second substrate.

16. A driving method of an electrophoretic display device including a first substrate and a second substrate, an electrophoretic layer that is arranged between the first substrate and the second substrate and that includes at least a dispersion medium and positively or negatively charged colored particles mixed into the dispersion medium, first electrodes that are formed for each pixel on the electrophoretic layer side of the first substrate and that are independently driven for each pixel, transistors connected to the first electrodes, opposing electrodes that are formed on the electrophoretic layer side of the second substrate, have larger areas than the first electrodes, and have transparency, and a reflecting layer that is formed over the first substrate and reflects light over a larger area than the first electrodes, wherein the gradation is controlled by an area of the colored particles that is visible when the electrophoretic layer is seen from the second substrate side, the driving method comprising:

a first operation of attracting the colored particles toward the first electrode side by applying a voltage to the first electrodes and the opposing electrodes;

a second operation of attracting the colored particles toward the opposing electrode side by applying a voltage to the first electrodes and the opposing electrodes; and in the first operation and the second operation, an electric potential that repels the colored particles is applied to the reflecting layer.

17. The driving method of an electrophoretic display device according to claim 16, wherein in the first operation of attracting the colored particles toward the first electrode side, with an electric potential applied to the opposing electrodes as a reference, a voltage of a different polarity from the first electrodes or the same voltage as the opposing electrodes is applied to the reflecting layer.

18. The driving method of an electrophoretic display device according to claim 16, further comprising:

a first presetting operation of attracting the colored particles toward the first electrodes or the opposing electrode side by applying a positive voltage to the first electrodes with an electric potential applied to the opposing electrodes as a reference; and a second presetting operation of attracting the colored particles toward the first electrodes or the opposing electrode side by applying a voltage with the opposite polarity to that in the first presetting operation to the first electrodes.

19. The driving method of an electrophoretic display device according to claim 16, wherein the electrophoretic display device includes first colored particles that are positively charged, negatively charged second colored particles in the same color as the first colored particles, and second electrodes to the electrophoretic layer side of the first substrate, the driving method further comprising:

a first presetting operation that applies, to the first electrodes and the second electrodes, voltages that are different to one another or a voltage that is the same; and a second presetting operation that applies, to the first electrodes and the second electrodes, a voltage that has the opposite polarity from that of the first presetting operation.

20. An electronic apparatus comprising the electrophoretic display device according to claim 1.

* * * * *